(12) United States Patent
Ikushima et al.

(10) Patent No.: US 7,907,670 B2
(45) Date of Patent: Mar. 15, 2011

(54) DATA TRANSMITTING APPARATUS AND DATA RECEIVING APPARATUS

(75) Inventors: Tsuyoshi Ikushima, Nara (JP); Masaru Fuse, Osaka (JP); Satoshi Furusawa, Osaka (JP); Tomokazu Sada, Osaka (JP); Tomoaki Ohira, Osaka (JP)

(73) Assignee: Panasonic Corporation, Osaka (JP)

( * ) Notice: Subject to any disclaimer, the term of this patent is extended or adjusted under 35 U.S.C. 154(b) by 882 days.

(21) Appl. No.: 11/889,469

(22) Filed: Aug. 14, 2007

(65) Prior Publication Data

US 2008/0247547 A1 Oct. 9, 2008

(30) Foreign Application Priority Data

Aug. 23, 2006 (JP) .................................. 2006-226465

(51) Int. Cl.
*H04L 27/00* (2006.01)
(52) U.S. Cl. ........ 375/259; 375/261; 375/264; 375/286; 380/255; 380/270; 380/277; 380/31
(58) Field of Classification Search .................. 375/259, 375/261, 264, 286; 380/255, 270, 277, 31
See application file for complete search history.

(56) References Cited

U.S. PATENT DOCUMENTS

| 5,848,160 A * | 12/1998 | Cai et al. ..................... 380/44 |
| 7,471,790 B2 * | 12/2008 | Yoshida et al. ............... 380/28 |
| 7,813,433 B2 * | 10/2010 | Moffatt ..................... 375/260 |
| 2006/0280307 A1 * | 12/2006 | Ikushima et al. ............ 380/277 |
| 2008/0095544 A1 * | 4/2008 | Fuse et al. ................... 398/202 |

FOREIGN PATENT DOCUMENTS

JP 2005-057313 3/2005

* cited by examiner

*Primary Examiner* — Phuong Phu
(74) *Attorney, Agent, or Firm* — Wenderoth, Lind & Ponack, L.L.P.

(57) ABSTRACT

A data communication apparatus which improves security against eavesdropping is provided for secret communication using Y-00 protocol. In a data transmitting apparatus 101, a multi-level code generation section 111 generates, based on key information 11, a multi-level code sequence 12 in which a signal level changes so as to be approximately random numbers. A multi-level processing section 112 generates a multi-level signal 13 having a plurality of levels each corresponding to a combination between information data 10 and the multi-level code sequence 12. A level conversion section 113 divides the plurality of levels of the multi-level signal 13 into several groups, and allocates one level of a converted multi-level signal 21 to a plurality of levels included in each of the several groups in an overlapped manner. The level conversion section 113 then converts the multi-level signal 13 into the converted multi-level signal 21. A modulator section 114 modulates the converted multi-level signal 21 and outputs a modulated signal 14.

18 Claims, 29 Drawing Sheets

FIG. 9

| (a) MULTI-LEVEL CODE SEQUENCE 12 | (b) INVERTED SIGNAL 23 | (c) CONVERTED MULTI-LEVEL CODE SEQUENCE 22 | (d) SIGNAL LEVEL ARRANGEMENT OF MULTI-LEVEL SIGNAL 13 |
|---|---|---|---|
| 1111 (15) | 1 | 1 | |
| 1110 (14) | 0 | | MULTI-LEVEL SIGNAL LEVEL    CONVERTED MULTI-LEVEL CODE SEQUENCE    XOR |
| 1101 (13) | 1 | | |
| 1100 (12) | 0 | | ——— L4    1    1 |
| 1011 (11) | 1 | | |
| 1010 (10) | 0 | | |
| 1001 (9) | 1 | | ——— L3    0    1 |
| 1000 (8) | 0 | | |
| 0111 (7) | 1 | 0 | ——— L2    1    0 |
| 0110 (6) | 0 | | |
| 0101 (5) | 1 | | |
| 0100 (4) | 0 | | ——— L1    0    0 |
| 0011 (3) | 1 | | |
| 0010 (2) | 0 | | |
| 0001 (1) | 1 | | |
| 0000 (0) | 0 | | |

FIG. 16

| (a) MULTI-LEVEL CODE SEQUENCE 12 | (b) INVERTED SIGNAL 23 |
|---|---|
| 1111 (15) | 1 |
| 1110 (14) | 0 |
| 1101 (13) | 1 |
| 1100 (12) | 0 |
| 1011 (11) | 1 |
| 1010 (10) | 0 |
| 1001 (9) | 1 |
| 1000 (8) | 0 |
| 0111 (7) | 1 |
| 0110 (6) | 0 |
| 0101 (5) | 1 |
| 0100 (4) | 0 |
| 0011 (3) | 1 |
| 0010 (2) | 0 |
| 0001 (1) | 1 |
| 0000 (0) | 0 |

F I G. 1 7

| (a) INFORMATION DATA 10 | (b) INVERTED SIGNAL 23 | (c) BINARY CONVERTED SIGNAL 24 |
|---|---|---|
| 1 | 1 | 0 |
| 1 | 0 | 1 |
| 0 | 1 | 1 |
| 0 | 0 | 0 |

FIG. 18

| TIME | t1 | t2 | t3 | t4 |
|---|---|---|---|---|
| (a) INFORMATION DATA 10 | 0 | 1 | 1 | 1 |
| (b) MULTI-LEVEL CODE SEQUENCE 12 | 0010 | 1101 | 1001 | 1100 |
| (c) INVERTED SIGNAL 23 | 0 | 1 | 1 | 0 |
| (d) BINARY CONVERTED SIGNAL 24 | 0 | 0 | 0 | 1 |
| (e) INVERTED SIGNAL 32 | 0 | 1 | 1 | 0 |
| (f) INFORMATION DATA 18 | 0 | 1 | 1 | 1 |
| (g) EAVESDROPPER'S RECEIVING SEQUENCE 42 [IN THE CASE OF KNOWN PLAINTEXT ATTACK] | ???0 | ???1 | ???1 | ???0 |

FIG. 21

PATTERN 1

| MULTI-LEVEL CODE SEQUENCE 12 | INVERTED SIGNAL 23 | CONVERTED MULTI-LEVEL CODE SEQUENCE 22 |
|---|---|---|
| 1111 (15) | 1 | 1 |
| 1110 (14) | 0 | |
| 1101 (13) | 1 | |
| 1100 (12) | 0 | |
| 1011 (11) | 1 | |
| 1010 (10) | 0 | |
| 1001 (9) | 1 | |
| 1000 (8) | 0 | |
| 0111 (7) | 1 | 0 |
| 0110 (6) | 0 | |
| 0101 (5) | 1 | |
| 0100 (4) | 0 | |
| 0011 (3) | 1 | |
| 0010 (2) | 0 | |
| 0001 (1) | 1 | |
| 0000 (0) | 0 | |

PATTERN 2

| MULTI-LEVEL CODE SEQUENCE 12 | INVERTED SIGNAL 23 | CONVERTED MULTI-LEVEL CODE SEQUENCE 22 |
|---|---|---|
| 1111 (15) | 1 | 1 |
| 1110 (14) | 0 | |
| 1101 (13) | 1 | |
| 1100 (12) | 0 | |
| 0111 (7) | 1 | |
| 0110 (6) | 0 | |
| 0101 (5) | 1 | |
| 0100 (4) | 0 | |
| 1011 (11) | 1 | 0 |
| 1010 (10) | 0 | |
| 1001 (9) | 1 | |
| 1000 (8) | 0 | |
| 0011 (3) | 1 | |
| 0010 (2) | 0 | |
| 0001 (1) | 1 | |
| 0000 (0) | 0 | |

PATTERN 3

| MULTI-LEVEL CODE SEQUENCE 12 | INVERTED SIGNAL 23 | CONVERTED MULTI-LEVEL CODE SEQUENCE 22 |
|---|---|---|
| 1111 (15) | 1 | 1 |
| 1110 (14) | 1 | |
| 1011 (11) | 1 | |
| 1010 (10) | 1 | |
| 0111 (7) | 0 | |
| 0110 (6) | 0 | |
| 0011 (3) | 0 | |
| 0010 (2) | 0 | |
| 1101 (13) | 1 | 0 |
| 1100 (12) | 1 | |
| 1001 (9) | 1 | |
| 1000 (8) | 1 | |
| 0101 (5) | 0 | |
| 0100 (4) | 0 | |
| 0001 (1) | 0 | |
| 0000 (0) | 0 | |

PATTERN 4

| MULTI-LEVEL CODE SEQUENCE 12 | INVERTED SIGNAL 23 | CONVERTED MULTI-LEVEL CODE SEQUENCE 22 |
|---|---|---|
| 1111 (15) | 1 | 1 |
| 1110 (14) | 1 | |
| 1011 (11) | 1 | |
| 1010 (10) | 1 | |
| 0111 (7) | 0 | |
| 0110 (6) | 0 | |
| 0011 (3) | 0 | |
| 0010 (2) | 0 | |
| 1101 (13) | 1 | 0 |
| 1100 (12) | 1 | |
| 1001 (9) | 1 | |
| 1000 (8) | 1 | |
| 0101 (5) | 0 | |
| 0100 (4) | 0 | |
| 0001 (1) | 0 | |
| 0000 (0) | 0 | |

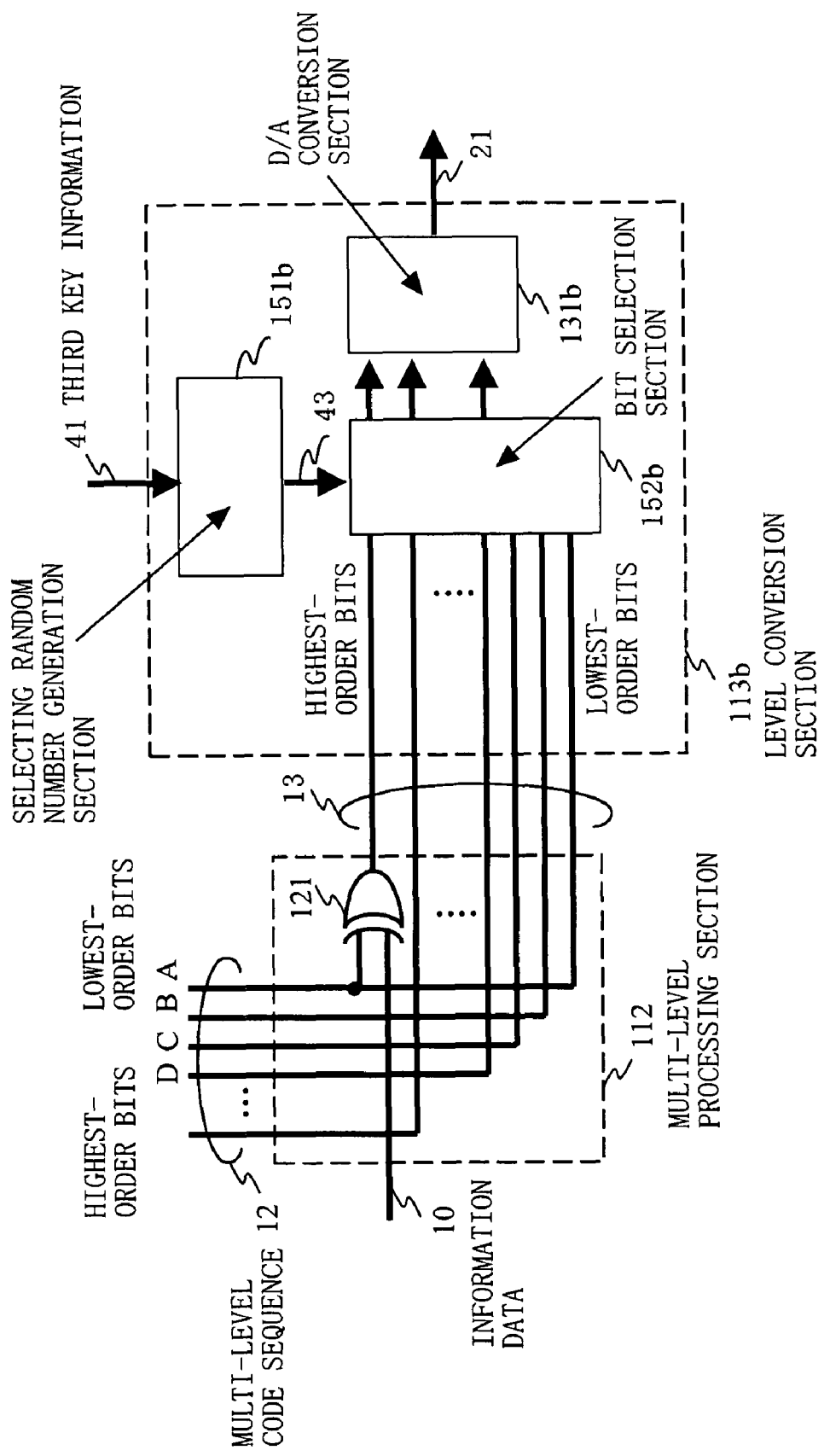
F I G. 2 4

… ….

DATA TRANSMITTING APPARATUS AND DATA RECEIVING APPARATUS

BACKGROUND OF THE INVENTION

1. Field of the Invention

The present invention relates to an apparatus for performing secret communication in order to avoid illegal eavesdropping and interception by a third party. More specifically, the present invention relates to a data transmitting apparatus for performing data communication through selecting and setting a specific encoding/decoding (modulation/demodulation) method between a legitimate transmitter and a legitimate receiver.

2. Description of the Background Art

Conventionally, in order to perform communication between specific parties, there has been adopted a structure for realizing secret communication by sharing original information (key information) for encoding/decoding between transmitting and receiving ends and by performing, based on the original information, an operation/inverse operation on information data (plain text) to be transmitted, in a mathematical manner.

On the other hand, there have been suggested, in recent years, several encryption methods, which positively utilize physical phenomenon occurring in a transmission line. As one of the encryption methods, there is a method called Y-00 protocol performing the secret communication by utilizing a quantum noise generated in an optical transmission line. An exemplary transmitting apparatus utilizing the Y-00 protocol method is disclosed in Japanese Laid-Open Patent Publication No. 2005-57313 (hereinafter referred to as Patent Document 1).

FIG. 25 is a block diagram showing an exemplary configuration of a conventional transmitting and receiving apparatus using the Y-00 protocol. As shown in FIG. 25, A transmitting section 901 includes a first multi-level code generation section 911, a multi-level processing section 912, and a modulator section 913. A receiving section 902 includes a demodulator section 915, a second multi-level code generation section 914, and a decision section 916. The transmitting section 901 and the receiving section 902 previously retain first key information 91 and second key information 96, respectively, which are identical in content to each other. The first multi-level code generation section 911 generates, based on the first key information 91, a multi-level code sequence 92, which is a multi-level pseudo random number series having M values from "0" to "M−1".

The multi-level processing section 912 combines information data 90 and the multi-level code sequence 92, and generates a signal, which has a level corresponding to a combination between a level of the information data 90 and a level of the multi-level code sequence 92, as a multi-level signal 93. Specifically, the multi-level processing section 912 generates the multi-level signal 93, which is an intensity-modulated signal, by using a signal format as shown in FIG. 26. That is, the multi-level processing section 912 divides signal intensity of the multi-level code sequence 92 into 2M levels, makes, from these levels, M combinations each having 2 levels, and allocates "0" of the information data 90 to one level of each of the M combinations, and "1" of the information data 90 to the other level of each of the M combinations. The multi-level processing section 912 allocates "0" and "1" of the information data 90 such that the levels corresponding to "0" and "1" are evenly distributed over the whole of the 2M levels. In an example shown in FIG. 26, "0" and "1" are allocated alternately.

In accordance with a value of the multi-level code sequence 92 to be inputted, the multi-level processing section 912 selects one combination from among the M combinations of levels of the multi-level code sequence 92. Next, in accordance with a value of the information data 90, the multi-level processing section 912 selects one level of the selected one combination of the multi-level code sequence 92, and generates the multi-level signal 93 including the selected one level. In Patent Document 1, the first multi-level code generation section 911 is described as a transmitting pseudo random number generation section, the multi-level processing section 912 as a modulation method specification section and a laser modulation driving section, the modulator section 913 as a laser diode, the demodulator section 915 as a photo detector, the second multi-level code generation section 914 as a receiving pseudo random number generation section, and the decision section 916 as a determination circuit.

FIG. 27 is a schematic diagram illustrating a signal form used in a conventional transmitting and receiving apparatus. (a), (b), (c), (d), (e), (f), (g) of FIG. 27 shows an exemplary signal change in the case of M=4. For example, in the case where the value of the information data 90 changes "0 1 1 1" (see FIG. 27(a)), and in the case where the value of the multi-level code sequence 92 changes "0 3 2 1" (see FIG. 27(b)), the multi-level signal 93 changes as shown in FIG. 27(c). The modulator section 913 converts the multi-level signal 93 into a modulated signal 94, which is an optical intensity modulated signal, and transmits the modulated signal 94 via an optical transmission line 910.

The demodulator section 915 performs photoelectric conversion of the modulated signal 94 having been transmitted via the optical transmission line 910, and outputs a multi-level signal 95. The second multi-level code generation section 914 generates, based on the second key information 96, a multi-level code sequence 97, which is a multi-level pseudo random number series, and which is identical to the multi-level code sequence 92. The decision section 916 determines, based on a value of the multi-level code sequence 97, which one of a combination of signal levels shown in FIG. 27 is used as the multi-level signal 95, and decides, in binary form, two signal levels included in the combination.

Specifically, the decision section 916 sets a decision level in accordance with the value of the multi-level code sequence 97, as shown in FIG. 27(e), and decides whether the multi-level signal 95 is larger (upper) or smaller (lower) than the decision level. In this example, decisions made by the decision section 916 are "lower, lower, upper, and lower". Next, the decision section 916 decides that a lower side is "0" and an upper side is "1" in the case where the multi-level code sequence 97 is even-numbered, and also decides that the lower side is "1" and the upper side is "0" in the case where the multi-level code sequence 97 is odd-numbered. The decision section 916 then outputs information data 98. In this example, the multi-level code sequence 97 is composed of "even number, odd number, even number, and odd number", and thus the information data 98 comes to be "0 1 1 1", in turn. Although the multi-level signal 95 includes a noise, as long as a signal intensity is selected appropriately, it is possible to suppress the noise to the extent that occurrence of an error at the time of a binary decision can be ignored.

Next, possible eavesdropping will be described. An eavesdropper attempts decryption of information data 90 or the first key information 91 from the modulated signal 94 without having key information which is shared between the transmitting and receiving parties. In the case where the eavesdropper performs the binary decision in the same manner as the legitimate receiving party, since the eavesdropper does not have the key information, the eavesdropper needs to attempt decision of all possible values that the key information may take. When this method is used, the number of such attempts increases exponentially with respect to a length of the key information. Accordingly, if the length of the key information is significantly long, the method is not practical.

As an effective method, it is assumed that, with the use of the eavesdropper receiving section 903, the eavesdropper attempts decryption of the information data 90 or the first key information 91 from the modulated signal 94. In the eavesdropper receiving section 903, the demodulator section 921 demodulates the modulated signal 94 which is obtained after having being branched off from the optical transmission line 910, and reproduces the multi-level signal 95. The multi-level decision section 922 performs a multi-level decision with respect to a multi-level signal 81, and outputs obtained information as a received sequence 82. The decryption processing section 923 performs decryption with respect to the received sequence 82 and attempts identification of the information data 90 or the first key information 91. In the case of using a decryption method as above described, if the eavesdropper receiving section 903 can perform the multi-level decision with respect to the received sequence 82 without mistake, the eavesdropper receiving section 903 can decrypts the first key information 91 from the received sequence 82 at a first attempt.

However, at the time of photoelectric conversion by the demodulator section 921, a shot noise is generated, and is overlapped on the multi-level signal 81. It is known that the shot noise is inevitably generated based on the principle of quantum mechanics. In the case where an interval (hereinafter referred to as a step width) between signal levels of a multi-level signal is set significantly smaller than a level of the shot noise, a possibility cannot be ignored that the multi-level signal 81 received based on erroneous decision may take various multi-levels other than a correct signal level. Therefore, the eavesdropper needs to perform the decryption processing in consideration of the possibility that the correct signal level may have a value different from that of a signal level obtained through the decision. In such a case, compared to a case without the erroneous decision (a stream cipher using a random number generator identical to that used for the first multi-level code generation section 911), the number of attempts, that is, computational complexity required for decryption is increased. As a result it is possible to improve security against the eavesdropping.

However, a probability distribution of the signal level, on which the shot noise is overlapped, conforms with a Poisson distribution. Therefore, in the case where the eavesdropper performs multi-level decision with respect to the multi-level signal 81, a probability of each of the levels of the multi-level signal to be decided will not be uniform, and spread of the distribution will become small. For example, as shown in FIG. 28, in the case where a level of the multi-level signal having been transmitted is "4", a probability distribution of a multi-level which the eavesdropper obtains based on the multi-level decision has its maximum at "4", which is a correct level. A second highest probability appears at "3" and "5", which are adjoining levels to "4". Further, a probability of deciding remaining levels ("2" or lower, or "6" or higher) will be a value which can be ignored virtually. Therefore, the eavesdropper may only consider the possibility of these three levels of the multi-level signal to be decided, and thus the computational complexity require for the decryption will not be increased significantly.

Further, the eavesdropper can obtain a part of the information data 90 (plain text) such as header information used commonly for a certain electronic file format, and the modulated signal 94 (cipher text) corresponding thereto. It is assumed that, by using the part of the information data 90 and the modulated signal 94, the eavesdropper attempts identification of the key information from a value of a multi-level code sequence and also attempts decryption of remaining information data by using the obtained key information. An eavesdropping method like this is called a known plaintext attack. In this case, the values "1" and "0" of the information data are allocated to the levels of the multi-level signal alternately. Accordingly, with respect to each of the values the information data, a value of the level of the multi-level signal is taken alternately, which is equivalent to a case where the step width is substantially doubled. Therefore, a probability that the eavesdropper can decide a correct level of the multi-level signal is further increased, and the level of the multi-level signal can be identified uniquely as a matter of practice. In this situation, an effect of increase in the number of attempts required for the decryption cannot be obtained at all.

On the other hand, if the step width is reduced, the probability cannot be ignored that levels of multi-level, which are other than the correct level and the adjoining levels, will be taken. Accordingly, it is possible to increase the computational complexity required for the decryption. However, in that case, a multi-level number needs to be extremely large (for example, the multi-level number M needs to be several thousand, or several ten thousand or more). Accordingly the step width becomes significantly small, and as a result significantly fine accuracy is required for controlling the multi-level number. Therefore, a hardware configuration becomes complicated, which leads to a problem of a cost increase.

SUMMARY OF THE INVENTION

Therefore, an object of the present invention is to solve the above-described problem, and to provide a data transmitting apparatus and a data receiving apparatus which are capable of effectively increasing the computational complexity required for decryption processing and improving safety against the eavesdropping without having a complicated software configuration.

The present invention is directed to a data transmitting apparatus for encrypting information data by using predetermined key information and performing secret communication with a receiving apparatus. To attain the above-described purpose, the data transmitting apparatus of the present invention includes: a multi-level code generation section for generating, based on the predetermined key information, a multi-level code sequence in which a signal level changes so as to be approximately random numbers; and a multi-level signal modulator section for generating a signal having a plurality of signal levels in accordance with the information data and the multi-level code sequence, modulating the generated signal in a predetermined modulation method, and outputting a modulated signal. The multi-level signal modulator section divides the signal having a plurality of levels each corresponding to a combination of the information data and the multi-level code sequence into a plurality of groups, and causes a plurality of levels included in each of the plurality of groups to be allocated to one level in an overlapped manner so as to generate the signal having the plurality of signal levels.

Preferably, the multi-level signal modulator section includes: a multi-level processing section for combining the information data and the multi-level code sequence, and generating a multi-level signal having the plurality of levels each corresponding to the combination of the information data and the multi-level code sequence; a level conversion section for dividing the multi-level signal into the plurality of groups, and causing the plurality of levels included in said each of the plurality of groups to be allocated to the one level in the overlapped manner so as to convert the multi-level signal into a converted multi-level signal; and a modulator section for modulating the converted multi-level signal in the predetermined modulation method, and outputting a modulated signal. The converted multi-level signal has a same symbol rate as the multi-level signal, and is a signal having a multi-level number smaller than a multi-level number of the multi-level signal.

Preferably, the multi-level signal is represented by a plurality of bits. In such a case, the level conversion section includes a D/A conversion section for selecting some of the plurality of bits of the multi-level signal, performing digital/analog conversion of the selected some of the plurality of bits, and generating the converted multi-level signal.

Further, the level conversion section may further include: a selecting random number generation section for generating a pseudo random number by using predetermined selecting key information; and a bit selection section for selecting the some of the plurality of bits of the multi-level signal in accordance with the pseudo random number. In such a case, the D/A conversion section performs the digital/analog conversion of the some of the plurality of bits selected by the bit selection section, and generates the converted multi-level signal.

The multi-level signal is represented by a plurality of bits. In such a case, the level conversion section includes: a bit conversion circuit in which the some of the plurality of bits of the multi-level signal are inputted, for performing a logical operation on the inputted some of the plurality of bits, and outputting a bit converted signal having a bit count smaller than a bit count of the inputted some of the plurality of bits; and a D/A conversion section for performing the digital/analog conversion of remaining bits of the plurality of bits of the multi-level signal, which are not to be inputted to the bit conversion circuit, and of the bit converted signal, and generating the converted multi-level signal.

Further, the level conversion section may further include: a random number generation section for generating a conversion random number which is a binary random number; and an exclusive-OR circuit for performing an exclusive-OR operation between any one of the plurality of bits of the multi-level signal and the conversion random number, and outputting a result of the exclusive-OR operation to the D/A conversion section.

Further, the multi-level signal modulator section includes: a multi-level code conversion section for converting the multi-level code sequence into a converted multi-level code sequence and an inverted signal; a multi-level processing section for combining the information data, the converted multi-level code sequence and the inverted signal, and generating a multi-level signal having a plurality of levels each corresponding to a combination among the information data, the converted multi-level code sequence, and the inverted signal; and a modulator section for modulating the multi-level signal in the predetermined modulation method and outputting a modulated signal. The converted multi-level code sequence is a signal which has a same symbol rate as the multi-level code sequence, and has a multi-level number smaller than a multi-level number of the multi-level code sequence. The inverted signal is a binary signal having a bit rate which is equal to the symbol rate of the multi-level code sequence.

The multi-level processing section performs an exclusive-OR operation between the information data and the inverted signal, combines a result of the exclusive-OR operation and the converted multi-level code sequence, and generates the multi-level signal.

The multi-level code conversion section causes a plurality of levels included in the multi-level code sequence to be allocated to one level, in an overlapped manner, so as to convert the multi-level code sequence into the converted multi-level code sequence.

The multi-level code sequence is represented by a plurality of bits. In such a case, the multi-level code conversion section outputs some of the plurality of bits of the multi-level code sequence as the converted multi-level code sequence, and also outputs any one of the plurality of bits of the multi-level code sequence as the inverted signal.

The multi-level code conversion section may include: a selecting random number generation section for generating a pseudo random number by using predetermined selecting key information; and a bit selection section for selecting some of the plurality of bits of the multi-level code sequence in accordance with the pseudo random number so as be outputted as the converted multi-level code sequence, and also outputting any one bit of the multi-level code sequence as the inverted signal.

The multi-level code sequence is represented by a plurality of bits. In such a case, the multi-level code conversion section includes a bit conversion circuit in which some of the plurality of bits of the multi-level code sequence are inputted, for performing a logical operation on the inputted some of the plurality of bits so as to be converted into a signal having a bit count smaller than a bit count of the inputted some of the plurality of bits, and for outputting the converted signal as a bit converted signal, and outputs remaining bits of the plurality of bits of the multi-level code sequence and the bit converted signal as the converted multi-level code sequence, and also outputs any one of the plurality of bits of the multi-level code sequence as the inverted signal.

The multi-level code conversion section may further include: a random number generation section for generating a conversion random number which is a binary random number; and a bit operation circuit in which any one of the plurality of bits of the multi-level code sequence is inputted, for performing an exclusive-OR operation between the inputted one of the plurality of bits and the conversion random number, and outputting a result of the exclusive-OR operation as the inputted one of the plurality of bits.

The multi-level signal modulator section includes: a multi-level code conversion section for converting the multi-level code sequence into an inverted signal; a signal conversion section for performing an exclusive-OR operation between the information data and the inverted signal, and outputting a result of the exclusive-OR operation as a binary converted signal; and a modulator section for modulating the binary converted signal in the predetermined modulation method, and outputting the modulated signal. The inverted signal and the binary converted signal are each a binary signal having a bit rate which is equal to a symbol rate of the multi-level code sequence.

The multi-level code sequence is represented by a plurality of bits. In such as case, the multi-level code conversion section outputs any one of the plurality of bits of the multi-level code sequence as the inverted signal.

The present invention is also directed to a data receiving apparatus for receiving information data which is encrypted based on predetermined key information and performing secret communication with a transmitting apparatus. To attain the above-described purpose, the data receiving apparatus of the present invention includes: a multi-level code generation section for generating, based on the predetermined key information, a multi-level code sequence in which a signal level changes so as to be approximately random numbers; a demodulator section for demodulating a modulated signal received from the transmitting apparatus, and outputting a signal having a plurality of levels each corresponding to a combination of the information data and the multi-level code sequence; and a signal reproduction section for reproducing, from the signal outputted by the demodulator section, the information data in accordance with the multi-level code sequence. The signal reproduction section has a same symbol rate as the multi-level code sequence, and decides the signal outputted by the demodulator section by using a signal, which has a multi-level number smaller than a multi-level number of the multi-level code sequence, as a decision level.

Preferably, the signal reproduction section includes: a multi-level code conversion section for converting the multi-level code sequence into a converted multi-level code sequence and an inverted signal in accordance with a predetermined rule; a decision section for deciding the multi-level signal in a binary manner in accordance with the converted multi-level code sequence; and a data inversion section for performing an exclusive-OR operation between a signal outputted by the decision section and the inverted signal, and outputting a result of the exclusive-OR operation as the information data. The converted multi-level code sequence has the same symbol rate as the multi-level code sequence, and is a signal having a multi-level number smaller than a multi-level number of the multi-level code sequence. The inverted signal is a binary signal having a bit rate which is equal to the symbol rate of the multi-level code sequence.

The multi-level code conversion section causes a plurality of levels included in the multi-level code sequence to be allocated to one level so as to convert the multi-level code sequence into the converted multi-level code sequence.

The multi-level code sequence is represented by a plurality of bits. In such a case, the multi-level code conversion section includes a D/A conversion section for selecting some of the plurality of bits of the multi-level code sequence, performing digital/analog conversion of the selected some of the plurality of bits, and generating the converted multi-level code sequence, and outputs one of the plurality of bits of the multi-level code sequence, which is not selected by the D/A conversion section, as the inverted signal.

Further, the multi-level code conversion section may further includes: a selecting random number generation section for generating a pseudo random number by using predetermined selecting key information; and a bit selection section for selecting some of the plurality of bits of the multi-level code sequence in accordance with the pseudo random number. In such a case, the D/A conversion section performs digital/analog conversion of the some of the plurality of bits selected by the bit selection section, and generates the converted multi-level code sequence. The bit selection section outputs one of the plurality of bits of the multi-level code sequence, which is not selected by the D/A conversion section, as the inverted signal.

The multi-level code sequence is represented by a plurality of bits. In such a case, the multi-level code conversion section includes: a bit conversion circuit in which the some of the plurality of bits of the multi-level code sequence is inputted, for converting the inputted some of the plurality of bits by using a logical operation, and outputting a bit converted signal having a bit count smaller than a bit count of the inputted some of the plurality of bits; and a D/A conversion section for performing digital/analog of remaining bits of the plurality of bits of the multi-level code sequence, which are not inputted to the bit conversion circuit, and the bit converted signal, and generating the converted multi-level code sequence.

Preferably, the signal reproduction section includes: a multi-level code conversion section for converting the multi-level code sequence into an inverted signal; a decision section for deciding the multi-level signal in a binary manner in accordance with a predetermined decision level; and a data inversion section for performing an exclusive-OR operation between a signal outputted by the decision section and the inverted signal, and outputting a result of the exclusive-OR operation as the information data. The inverted signal is a binary signal having a bit rate which is equal to a symbol rate of the multi-level code sequence.

According to the present invention, as above described, even in the case where the noise level is not significantly large with respect to the step width of the multi-level signal, it is impossible for an eavesdropper to identify, based on the level of a received signal, one value of the pseudo random number series used at the transmission end. Therefore, compared to a case where the eavesdropper can uniquely identify the value of the pseudo random number series, the number of attempts of the decryption so as to identify the encrypted key information, that is, the computational complexity required for the decryption processing, is increased. Therefore, it is possible to improve the safety against eavesdropping without complicating a hardware configuration.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a schematic diagram illustrating a signal level arrangement in the second embodiment of the present invention;

FIG. 16 is a diagram showing an exemplary relation between a multi-level code sequence and an inverted signal 23 according to the fourth embodiment of the present invention;

FIG. 17 is a diagram showing a relation among information data 10, the inverted signal 23, and a binary converted signal 24 in the fourth embodiment of the present invention;

FIG. 18 is a schematic diagram illustrating a signal form used for the data communication apparatus 4 according to the fourth embodiment of the present invention;

FIG. 21 is a diagram showing corresponding patterns among a multi-level code sequence 12, a converted multi-level code sequence 22, and an inverted signal 23 according to the fifth embodiment of the present invention;

FIG. 24 is a block diagram showing an exemplary configuration of a level conversion section 113b according to the fifth embodiment of the present invention;

DESCRIPTION OF THE PREFERRED EMBODIMENTS

Hereinafter, with reference to drawings, respective embodiments of the present invention will be described.

First Embodiment

Figure 1:
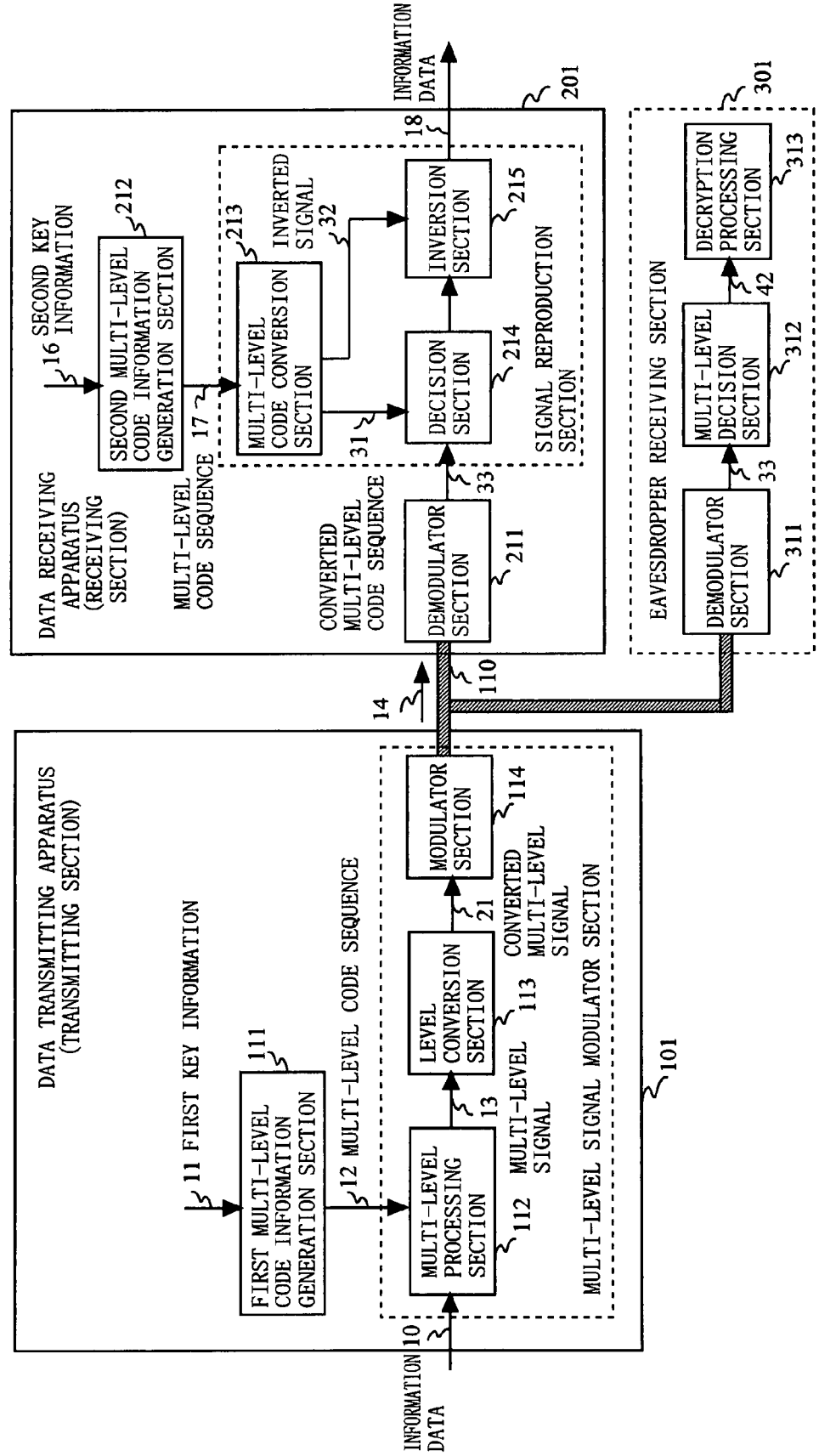
FIG. 1 is a block diagram showing an exemplary configuration of a data communication apparatus 1 according to a first embodiment of the present invention.

FIG. 1 is a block diagram showing an exemplary configuration of a data communication apparatus 1 according to a first embodiment of the present invention. As shown in FIG. 1, the data communication apparatus 1 has a configuration in which a data transmitting apparatus (hereinafter referred to as a transmitting section) 101 and a data receiving apparatus (hereinafter referred to as a receiving section) 201 are connected to each other via a transmission line 110. The transmitting section 101 includes a first multi-level code generation section 111, a multi-level processing section 112, an level conversion section 113, and a modulator section 114. The receiving section 201 includes a demodulator section 211, a second multi-level code generation section 212, a multi-level code conversion section 213, a decision section 214, and an inversion section 215. As the transmission line 110, a metal line such as a LAN cable or a coaxial line, or an optical waveguide such as an optical-fiber cable can be used. Further, the transmission line 110 is not limited to a wired cable such as the LAN cable, but can be free space which enables a wireless signal to be transmitted.

Figure 25:
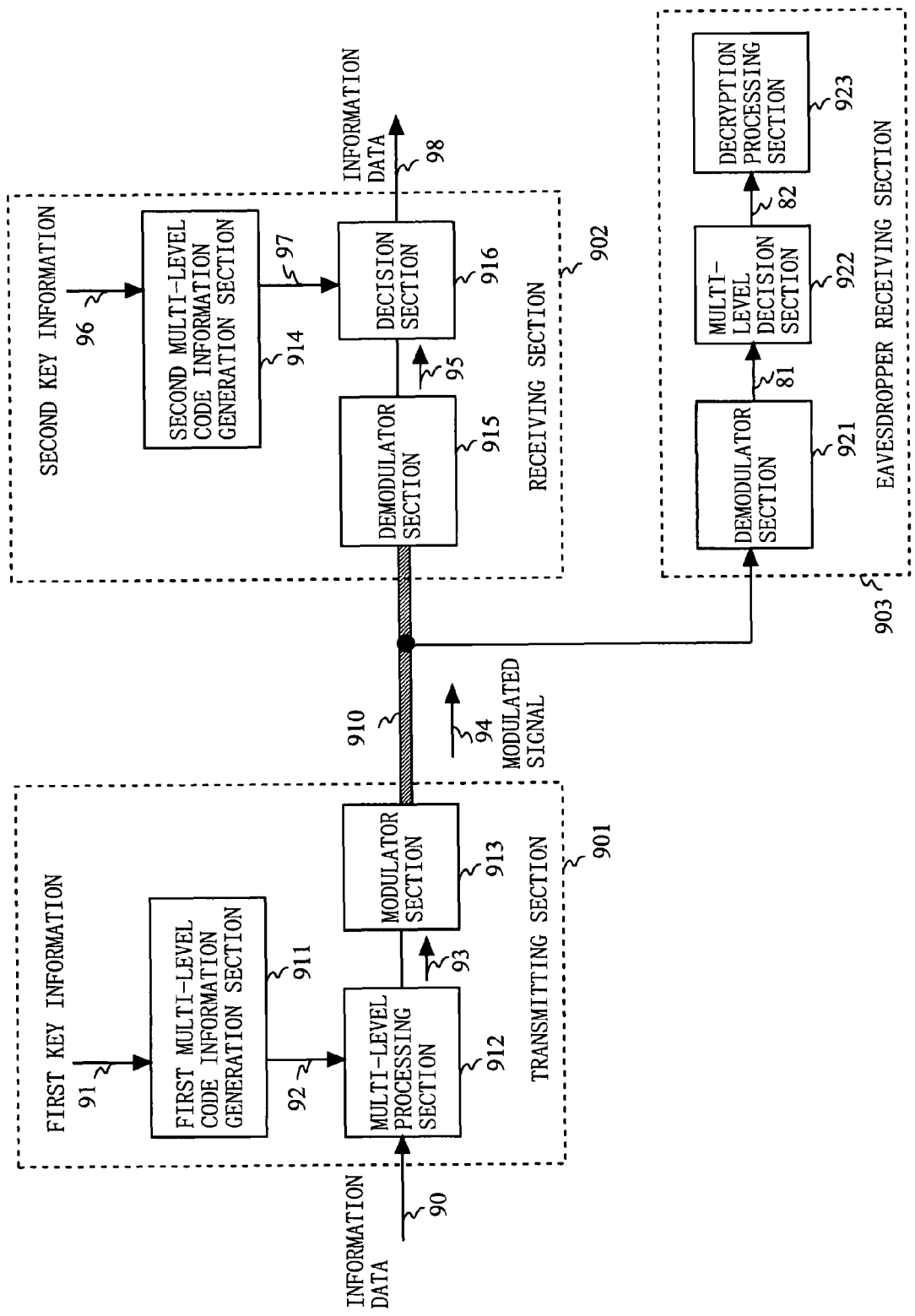
FIG. 25 is a block diagram showing an exemplary configuration of a conventional transmitting and receiving apparatus using a Y-00 protocol.
Figure 26:
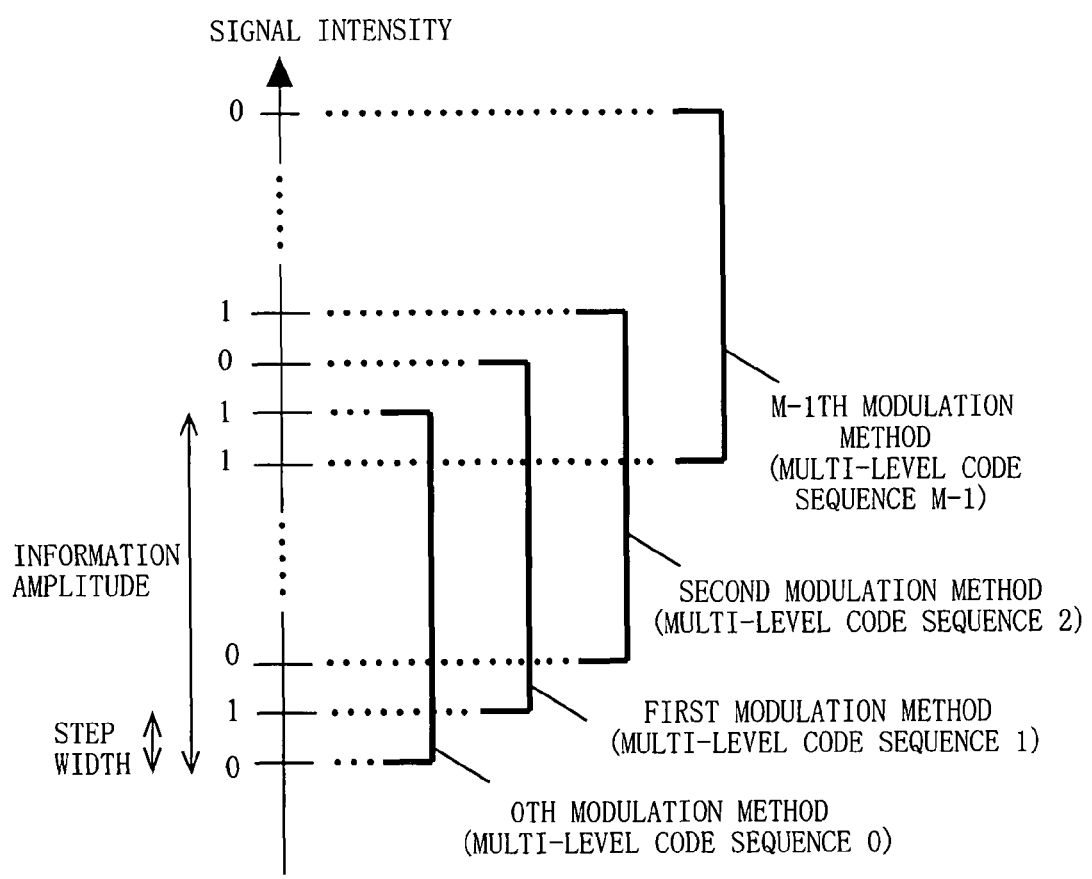
FIG. 26 is a schematic diagram for illustrating a signal level arrangement in the conventional transmitting and receiving apparatus using the Y-00 protocol.
Figure 27:
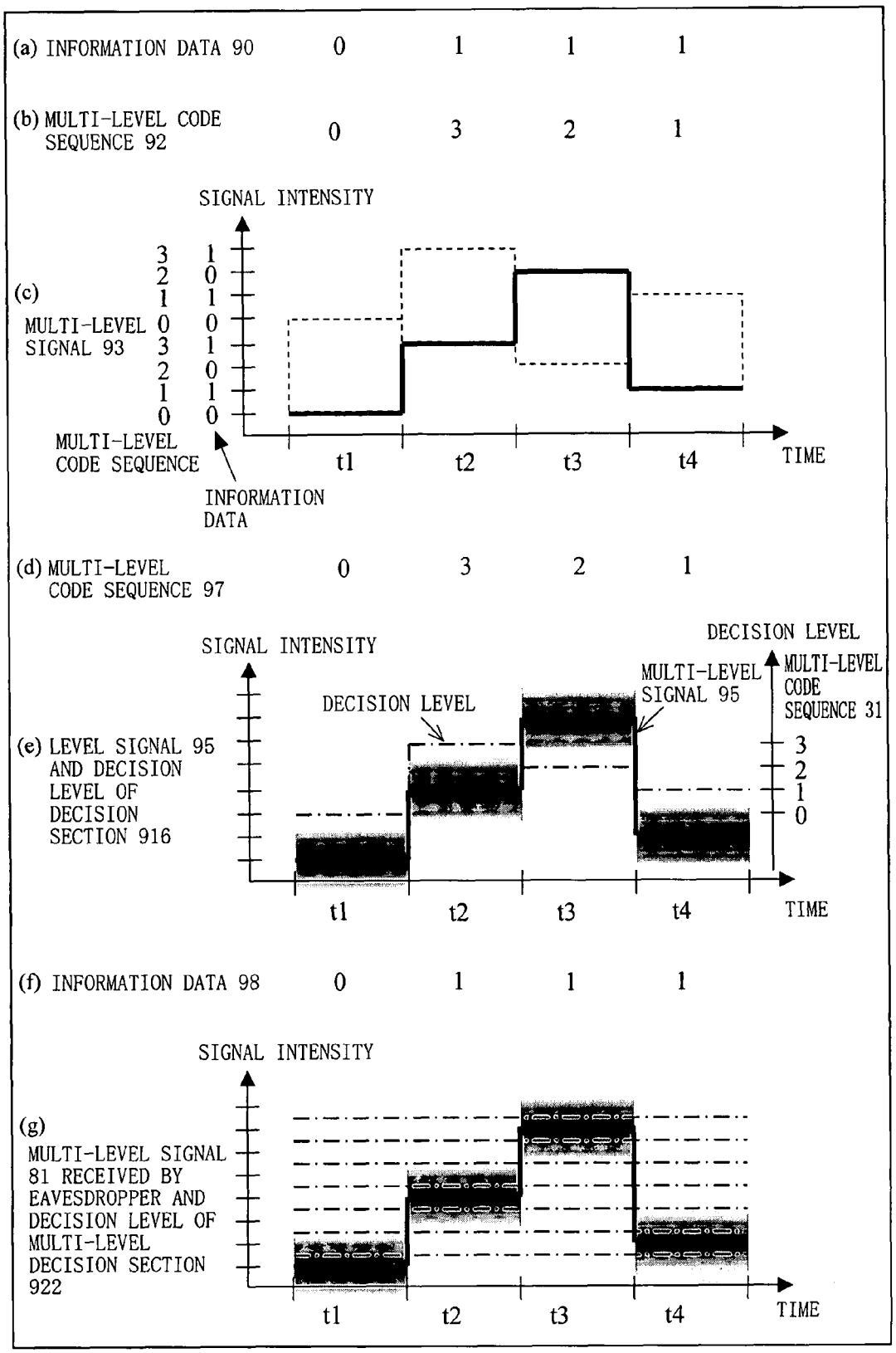
FIG. 27 is a schematic diagram illustrating a signal form used for the conventional transmitting and receiving apparatus.
Figure 28:
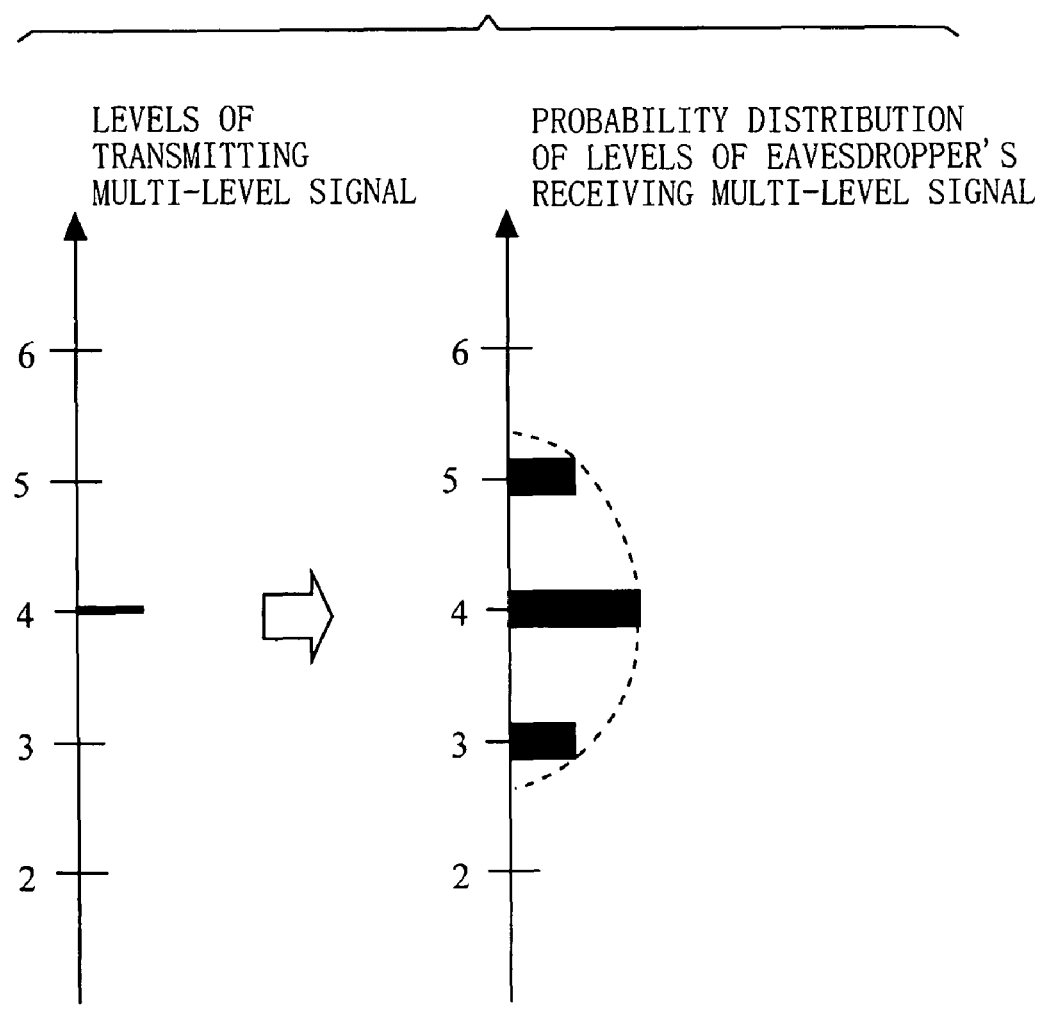
FIG. 28 is a schematic diagram illustrating a probability distribution of a multi-level decided by an eavesdropper.

The transmitting section 101 and the receiving section 201 previously have first key information 11 and second key information 16, respectively, which are identical to each other in content. In the transmitting section 101, the first multi-level code generation section 111 sets the first key information 11 as an initial value, and generates and outputs a multi-level code sequence 12, which is a multi-level pseudo random number sequence. A signal form of the multi-level code sequence 12 may be either a multi-level serial signal or a binary parallel signal. In the same manner as an example of a conventional art described with reference to FIG. 25, the multi-level processing section 112 combines information data 10 and a multi-level code sequence 12 in accordance with a predetermined procedure, and generates, as a multi-level signal 13, a signal having a level corresponding to a combination of a level of the information data 10 and a level of the multi-level code sequence 12.

The level conversion section 113 converts the multi-level signal 13 and outputs a converted multi-level signal 21. The converted multi-level signal 21 has the same symbol rate as the multi-level signal 13, and is a signal having a multi-level number smaller than a multi-level number of the multi-level signal 13. Details of the multi-level processing section 112 and the level conversion section 113 will be described later. The modulator section 114 modulates the converted multi-level signal 21 in a predetermined modulation method, and outputs a modulated signal 14 to the transmission line 110.

In the receiving section 201, the demodulator section 211 demodulates the modulated signal 14 transmitted via the transmission line 110, and reproduces a converted multi-level signal 33. In the same manner as the first multi-level code generation section 111, the second multi-level code generation section 212 sets the second key information 16 as an initial value, and generates and outputs a multi-level code sequence 17, which is a multi-level pseudo random number series. The multi-level code conversion section 213 generates a converted multi-level code sequence 31 and an inverted signal 32 from the multi-level code sequence 17.

Here, the converted multi-level code sequence 31 has the same symbol rate as the multi-level code sequence 17, and is a signal having a multi-level number smaller than a multi-level number of the multi-level code sequence 17. Further, the inverted signal 32 is a binary signal having a bit rate which is equal to the symbol rate of the multi-level code sequence 17. Details of the multi-level code conversion section 213 will be described later. The decision section 214 decides the converted multi-level signal 33 (binary decision) in accordance with the converted multi-level code sequence 31, and outputs a result of the decision. The inversion section performs an exclusive-OR operation between a signal outputted by the decision section 214 and the inverted signal 32, and outputs a result of the operation as information data 18.

As shown in FIG. 1, a receiving apparatus assumed to be used by the eavesdropper is described as an eavesdropper receiving section 301. Note that the eavesdropper receiving section 301 is merely described for the purpose of illustrating an effect of the present embodiment against eavesdropping, and is not included in the configuration of the data communication apparatus 1. A configuration and an operation of the eavesdropper receiving section 301 are the same as those described with reference to FIG. 25. The effect of the present embodiment against the eavesdropping will be described later.

Figure 2:
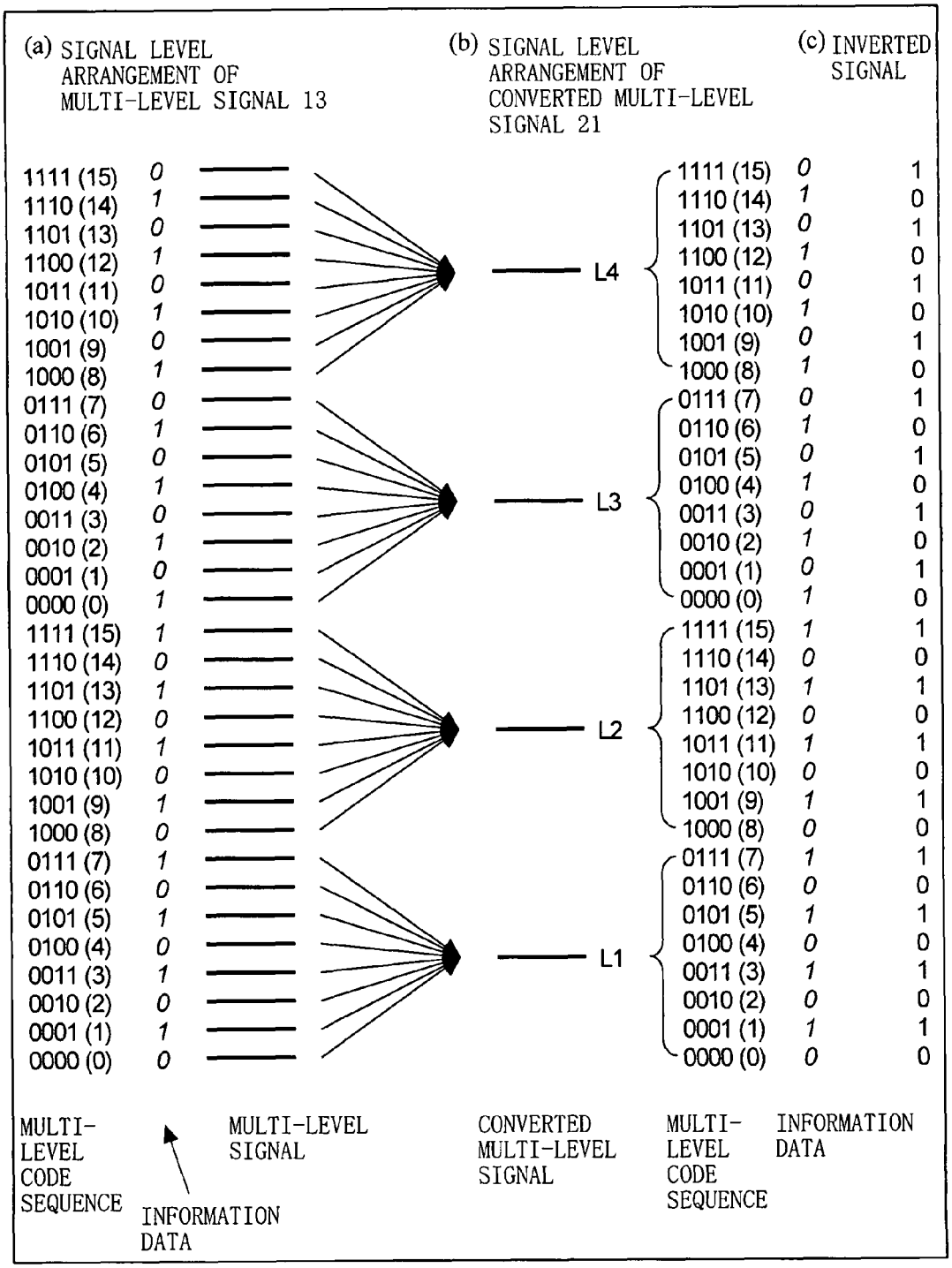
FIG. 2 is a schematic diagram illustrating a signal level arrangement in the first embodiment of the present invention.

With reference to FIG. 2, a signal level arrangement of each of the multi-level signal 13 and the converted multi-level signal 21, and a setting of the inverted signal 32 in the present embodiment will be described. FIG. 2 is a schematic diagram illustrating the signal level arrangement in the first embodiment of the present invention. As shown in FIG. 2, values of the multi-level code sequence 12 are each described in a binary number (numbers in parentheses are each described in a decimal number). As shown in FIG. 2(a), one level of the multi-level signal 13 is allocated to one combination of the multi-level code sequence 12 and the information data 10. On the other hand, one level of the converted multi-level signal 21 is allocated to a plurality of combinations of the multi-level code sequences and the information data 10 in an overlapped manner.

Here, the combination of the multi-level code sequence 12 and the information data 10 will be expressed in the form of (multi-level code sequence 12, information data 10). In an example shown in FIG. 2, L1, which is one level of the converted multi-level signal 21, is allocated to eight combinations of (0000,0), (0001, 1), (0010, 0), (0011, 1), (0100, 0), (0101, 1), (0110, 0), (0111, 1) in an overlapped manner. That is, the level conversion section 113 allocates a plurality of levels of the multi-level signal 13 to one level of the converted multi-level signal 21 in an overlapped manner, and converts the multi-level signal 13 into the converted multi-level signal 21.

In this manner, the transmitting section 101 generates a signal by intentionally reducing a part of information of the multi-level code sequence 12, and transmits the generated signal to the receiving section 201. In the receiving section 201, the multi-level code conversion section 213 divides levels of the multi-level code sequence 17 into a plurality of groups, in the same manner as the transmitting section 101, and allocates, in an overlapped manner, one level to a plurality of levels included in each of the plurality of groups. The multi-level code conversion section 213 then converts the multi-level code sequence 17 into the converted multi-level code sequence 31. A value of the inverted signal 32 is set to the same value as a lowest-order bit of the multi-level code sequence 17.

In transmitting section 101, the multi-level processing section 112, the level conversion section 113, and the modulator section 114 may be collectively described as a multi-level signal modulator section. Further, in the receiving section 201, the multi-level code conversion section 213, the decision section 214, and the inversion section 215 may be collectively described as a signal reproduction section.

Figure 3:
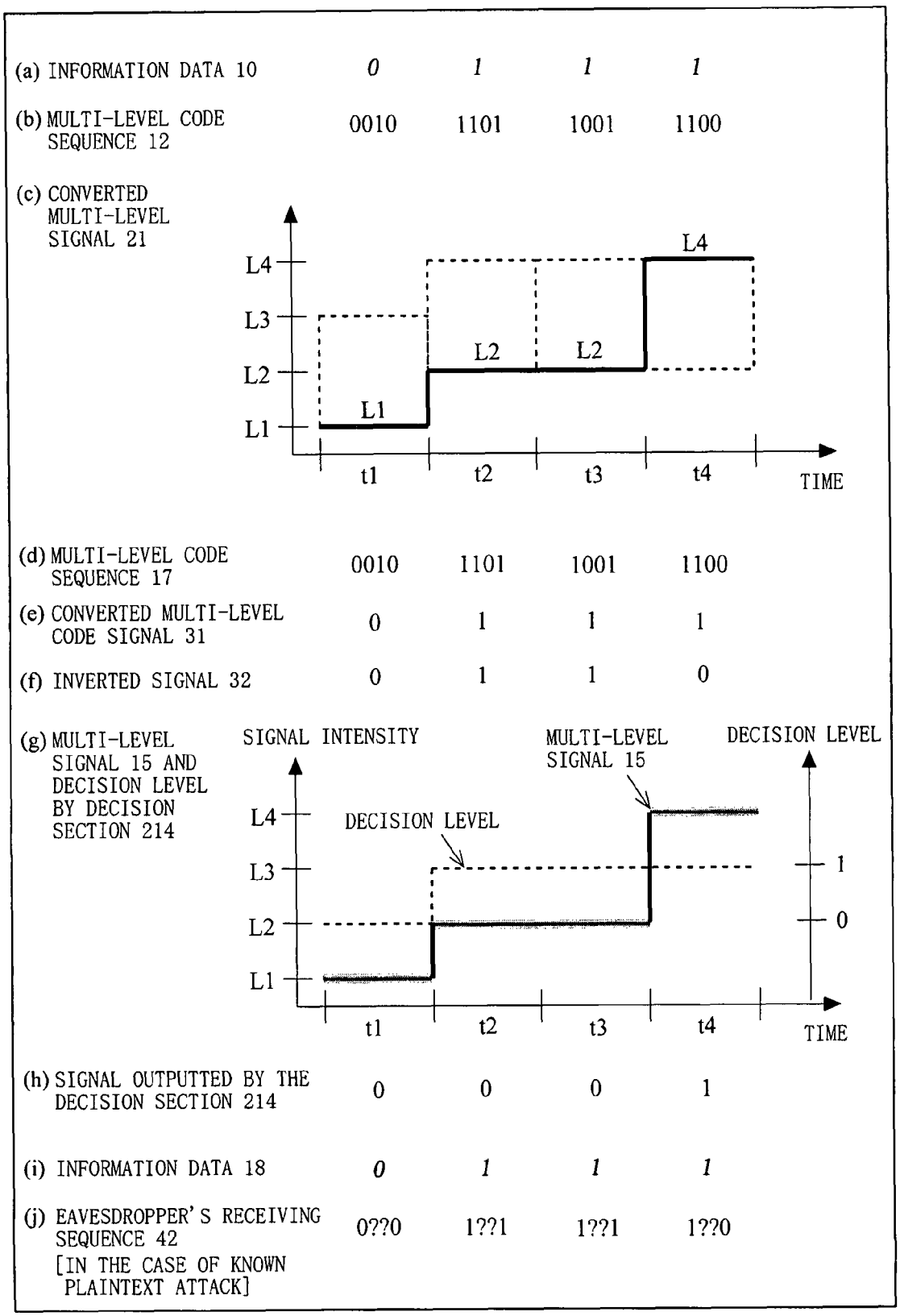
FIG. 3 is a schematic diagram illustrating a signal form used for the data communication apparatus 1 according to the first embodiment of the present invention.

With reference to FIG. 3, a signal form used in the present embodiment will be described. FIG. 3 is a schematic diagram illustrating a signal form used for the data communication apparatus 1 according to the first embodiment of the present invention. In FIG. 3, a case will be considered where values of the information data 10 and values of the multi-level code sequence 12 in respective time slots (t1 to t4) are those shown in (a) and (b) of FIG. 3. In this case, the level of the converted multi-level signal 21 changes "L1, L2, L2, L4" as shown in FIG. 3(c) in accordance with a relation shown in FIG. 2. The modulator section 114 modulates the converted multi-level signal 21, and transmits the modulated signal 14.

On the other hand, in the receiving section 201, the multi-level code conversion section 213 generates the converted multi-level code sequence 31 having the same value as a highest-order bit of the multi-level code sequence 17 (see FIG. 3(e)). Further, the multi-level code conversion section 213 generates the inverted signal 32 having the same value as the lowest-order bit of the multi-level code sequence 17 (see FIG. 3(f)). As shown in FIG. 3(g), the decision section 214 decides, in binary form, the converted multi-level signal 33, which is obtained by demodulating the modulated signal 14, by using the converted multi-level code sequence 31 as a decision level. The inversion section 215 performs the exclusive-OR operation between a signal outputted by the decision section 214 (see FIG. 3(h)) and the inverted signal 32, and outputs a result of the operation as the information data 18 (see FIG. 3(i)).

Next, an effect of the present embodiment against the eavesdropping will be described. Suppose that the eavesdropper attempts a known plaintext attack by using an eavesdropper receiving section 301. In the eaves dropper receiving section 301, the demodulator section 311 demodulates the modulated signal 14, which is obtained after having being branched off from the transmission line 110, and reproduces the converted multi-level signal 33. The multi-level decision section 312 is capable of identifying a level of the converted multi-level signal 33. However, the multi-level decision section 312 cannot identify a combination of the multi-level code sequence 12 and the information data 10 allocated in an overlapped manner. For example, with respect to time slot t1 shown in FIG. 3, the multi-level decision section 312 can identify that the level of the converted multi-level signal 33 is L1, but cannot identify a correct combination, among the eight combinations of the multi-level code sequence 12 and the information data 10, which corresponds to L1 as shown in FIG. 2.

The eavesdropper checks the converted multi-level signal 33 with the information data 10 previously obtained, thereby narrowing down a possible value of the multi-level code sequence 12. However, a possibility still remains that the multi-level code sequence 12 may take four different values. That is, as shown in FIG. 3(j), values of some bits of the received sequence 42 are unknown. With respect to time slots thereafter, a possibility still remains that the received sequence 42 may take four different values in each of the time slots. Here, assuming that a symbol length of the multi-level signal 41 required for decryption is X, a possible value which the multi-level signal 41 may take is $4^X$. The eavesdropper needs to perform the decryption with respect to all the $4^X$ patterns, and accordingly the number of attempts of the decryption processing, that is, the computational complexity required for the decryption is increased. In other words, compared to a case where the value of the received sequence 42 is determined uniquely, safety against eavesdropping is improved.

In FIGS. 2 and 3, a case has been described where the multi-level number of the multi-level code sequence 12 is 16 (a bit count is 4), and the number of the multi-level code sequence 12 to be overlapped (hereinafter referred to as an overlapping number) on the one level of the converted multi-level signal 21 is 8, but this is merely an example. Other values may be applied. The larger the overlapping number becomes, the more the number of the attempts of the decryption by the eavesdropper will be increased. Note that the overlapping number needs to be set so as not to exceed the multi-level number of the multi-level code sequence 12.

Further, in FIG. 2, signal levels are arranged such that when the level of the multi-level signal 13 (or the converted multi-level signal 21) increases, the value of the multi-level code sequence 12 increases accordingly. However, a correlation between the multi-level signal 13 (or the converted multi-level signal 21) and the multi-level code sequence 12 is not limited thereto. It is possible to correlate each of the levels of the multi-level signal 13 (or the converted multi-level signal 21) with a given value of the multi-level code sequence 12. Further, although the value of the inverted signal 32 is set to the same value as the lowest-order bit of the multi-level code sequence 17, the value of the inverted signal 32 may be set to a value of another bit.

In FIG. 3, a case has been described where a step width (in the present embodiment, an interval between signal levels of the converted multi-level signal 33 is referred to as the step width) is larger than a noise level. However, it is possible to set the step width smaller than the noise level, and have an additional effect of causing an erroneous multi-level decision. The erroneous multi-level decision by the eavesdropper is, for example, a case where the level of the converted multi-level signal 21 at a transmitting end is "L2", whereas the eavesdropper erroneously decides the level thereof as "L1". In this case, the eavesdropper needs to perform the decryption in consideration of values of the multi-level code sequence 12 which correspond to the adjoining levels of the converted multi-level signal 21, and thus the number of the attempts of the decryption is further increased.

Figure 4:
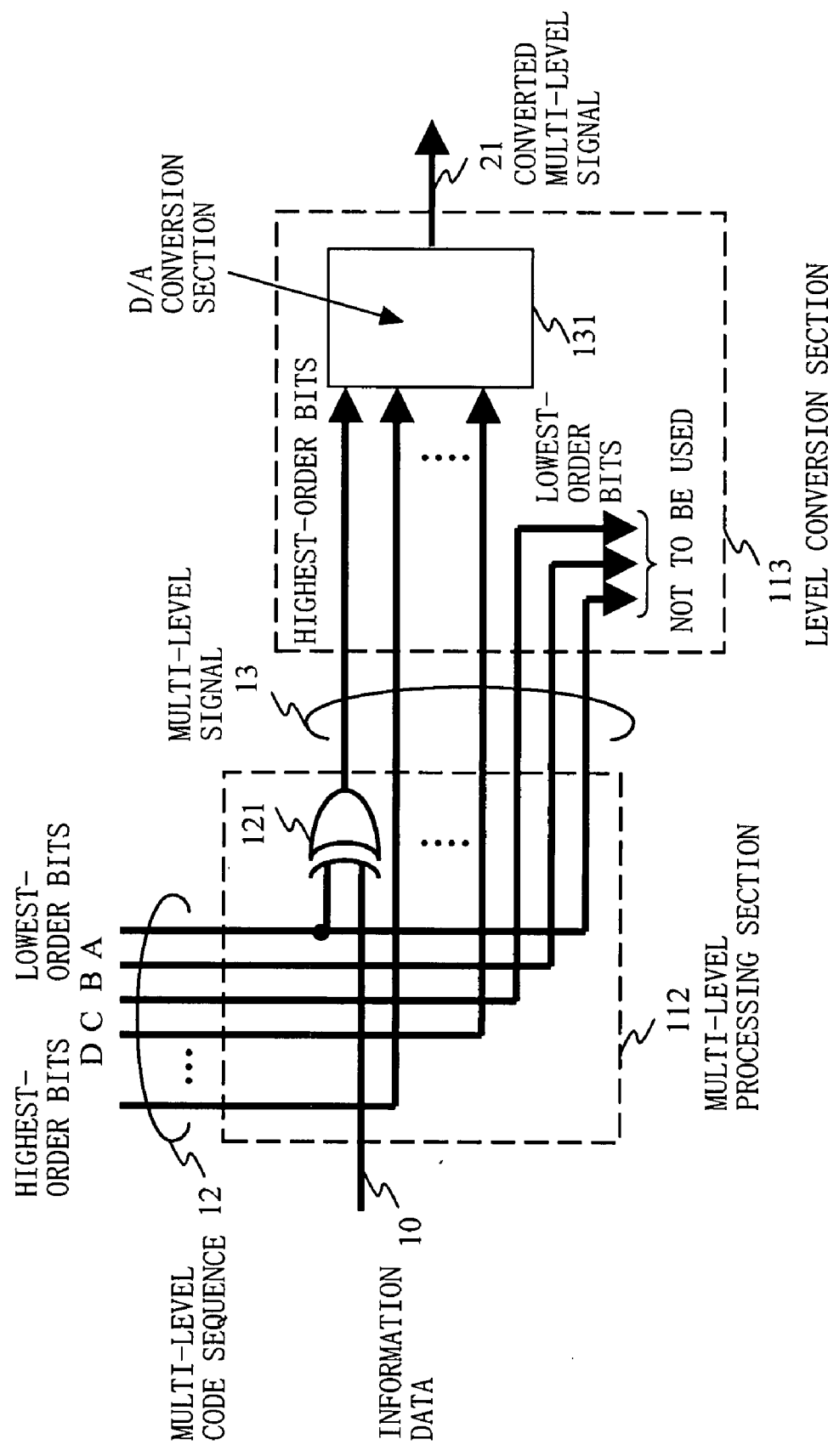
FIG. 4 is a block diagram showing a first exemplary configuration of a multi-level processing section 112 and a level conversion section 113 according to the first embodiment of the present invention.

Next, a specific configuration of the multi-level processing section 112 and the level conversion section 113 will be described. FIG. 4 is a block diagram showing a first exemplary configuration of the multi-level processing section 112 and the level conversion section 113 according to the first embodiment of the present invention. According to the configuration shown in FIG. 4, the multi-level code sequence 12 and the multi-level signal 13 are each in a parallel signal form, and the converted multi-level signal 21 is in a multi-level serial signal form. The multi-level processing section 112 includes an exclusive-OR circuit 121. The exclusive-OR circuit 121 performs the exclusive-OR operation between a lowest-order bit A of the multi-level code sequence 12 and the information data 10, and outputs a result of the operation as a highest-order bit of the multi-level signal 13. Further each of the bits of the multi-level code sequence 12 is outputted as it is as a bit other than the highest-order bit of the multi-level signal 13.

The level conversion section 113 includes a digital/analog conversion section (hereinafter referred to as a D/A conversion section) 131. Some bits of the multi-level signal 13 inputted to the level conversion section 113 are not used, and the remaining bits are outputted to the D/A conversion section 131. The D/A conversion section 131 performs the digital/analog conversion of the inputted bits, and outputs the converted multi-level signal 21. As shown in FIG. 4, the configuration is such that a lowest-order bit A of the multi-level code sequence 12 is inputted to the exclusive-OR circuit 121. However, as long as a bit is not used by the level conversion section 113 (A, B, and C in the drawing), any given bit may be inputted to the exclusive-OR circuit 121.

Figure 5:
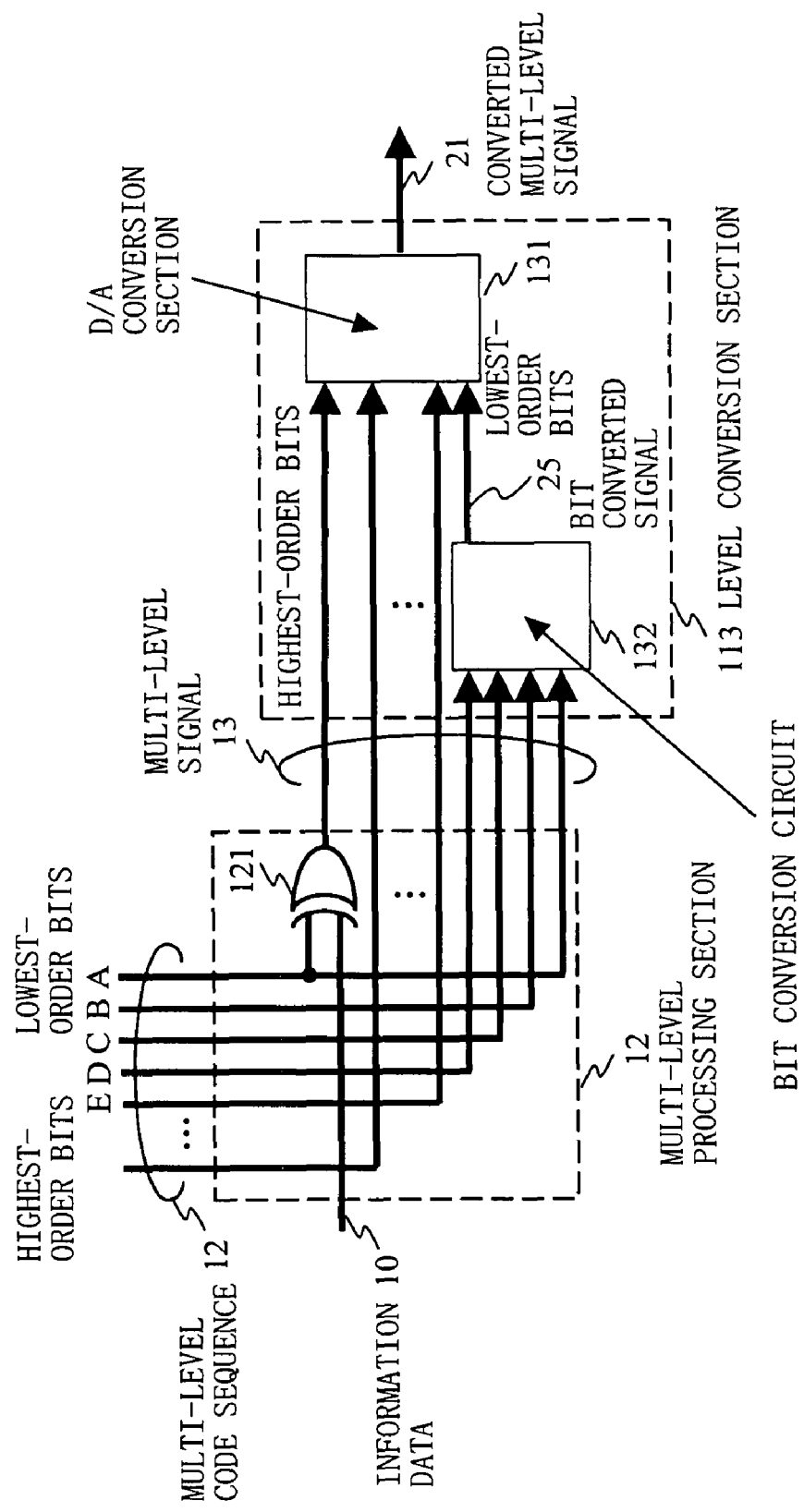
FIG. 5 is a block diagram showing a second exemplary configuration of the multi-level processing section 112 and the level conversion section 113 according to the first embodiment of the present invention.

FIG. 5 is a block diagram showing a second exemplary configuration of the multi-level processing section 112 and the level conversion section 113 according to the first embodiment of the present invention. In a configuration shown in FIG. 5 as well, the multi-level code sequence 12 and the multi-level signal 13 are each in a parallel signal form, and the converted multi-level signal 21 is in a multi-level serial signal form. A configuration and a function of the multi-level processing section 112 are the same as those shown in FIG. 4. The level conversion section 113 includes the D/A conversion section 131 and a bit conversion circuit 132. Some bits of the multi-level signal 13 are inputted to the bit conversion circuit 132. The bit conversion circuit 132 outputs a bit converted signal 25 which is a binary signal having a bit rate which is equal to the symbol rate of the multi-level signal 13.

A value of the bit converted signal 25 is decided based on a logical operation using respective bits inputted to the bit conversion circuit 132. That is, the bit conversion circuit 132 converts the inputted bits in accordance with the logical operation, and outputs a bit converted signal having a bit count smaller than the inputted bit count. To the D/A conversion section 131, those bits of the multi-level signal 13 which are not inputted to the bit conversion circuit 132, and the bit converted signal 25 are inputted. The D/A conversion section 131 performs the digital/analog conversion of the bits of the multi-level signal 13 which are not inputted to the bit conversion circuit 132, and the bit converted signal 25, and then outputs the converted multi-level signal 21. In FIG. 5, the configuration is such that the lowest-order bit of the multi-level code sequence 12 is inputted to the exclusive-OR circuit 121. However, as long as a bit (A, B, C, and D in the drawing) is inputted to the bit conversion circuit, any given bit may be inputted to the exclusive-OR circuit 121.

Figure 6:
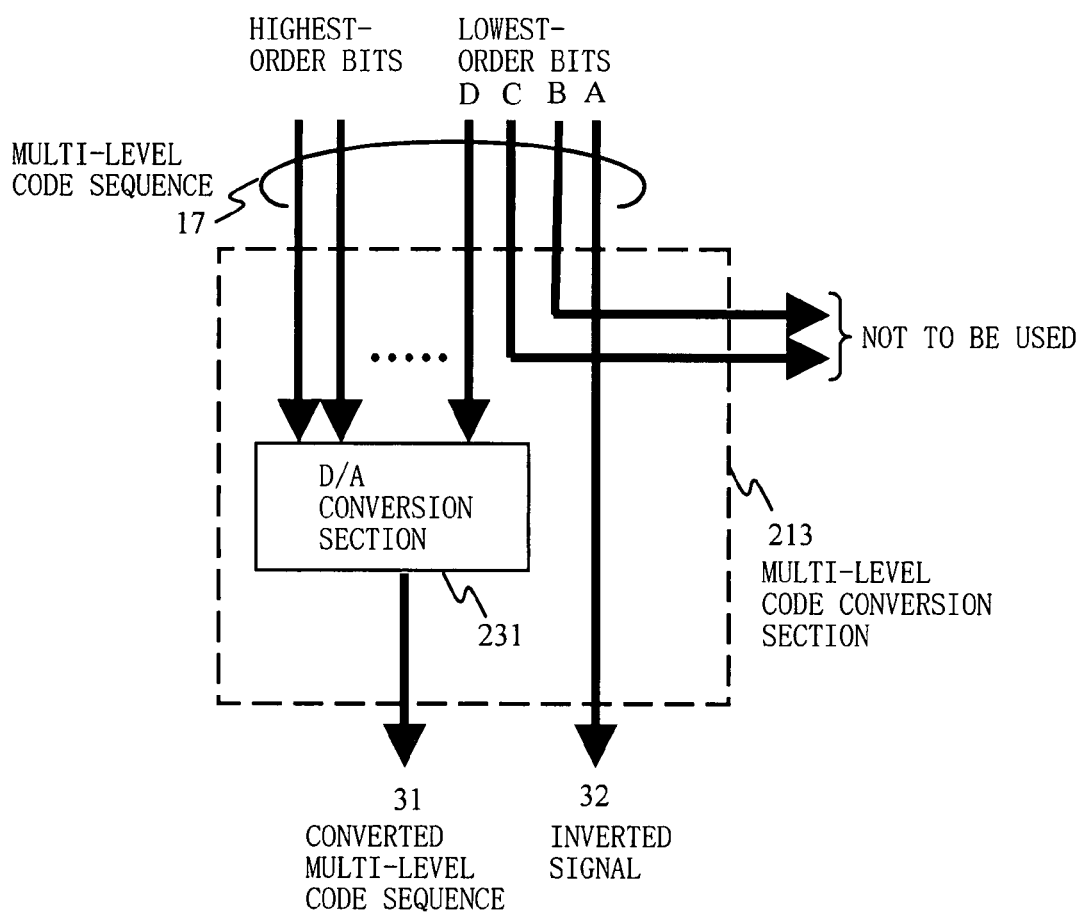
FIG. 6 is a block diagram showing a first exemplary configuration of a multi-level code conversion section 213 according to the first embodiment of the present invention.

Next, a specific configuration of the multi-level code conversion section 213 will be described. FIG. 6 is a block diagram showing a first exemplary configuration of the multi-level code conversion section 213 according to the first embodiment of the present invention. In the configuration shown in FIG. 6, the multi-level code sequence 17 is in a parallel signal form, and the converted multi-level code sequence 31 is in a multi-level serial signal form. The multi-level code conversion section 213 includes the D/A conversion section 231. In the multi-level code sequence 17 which is inputted to the multi-level code conversion section 213, remaining bits after subtracting some bits are inputted to the D/A conversion section 231. The D/A conversion section 231 performs the digital/analog conversion of the inputted bits, and outputs the converted multi-level code sequence 31. Further, the lowest-order bit (A in the drawing) of the multi-level code sequence 17 is outputted as it is as the inverted signal 32. The inverted signal 32 may be arbitrarily selected from the bits (A, B, and C in the drawing) of the multi-level code sequence 17 which are not inputted to the D/A conversion section 231. However, a bit, which has the same arrangement as the bit inputted to the exclusive-OR circuit 121 at the transmitting end, needs to be selected.

Figure 7:
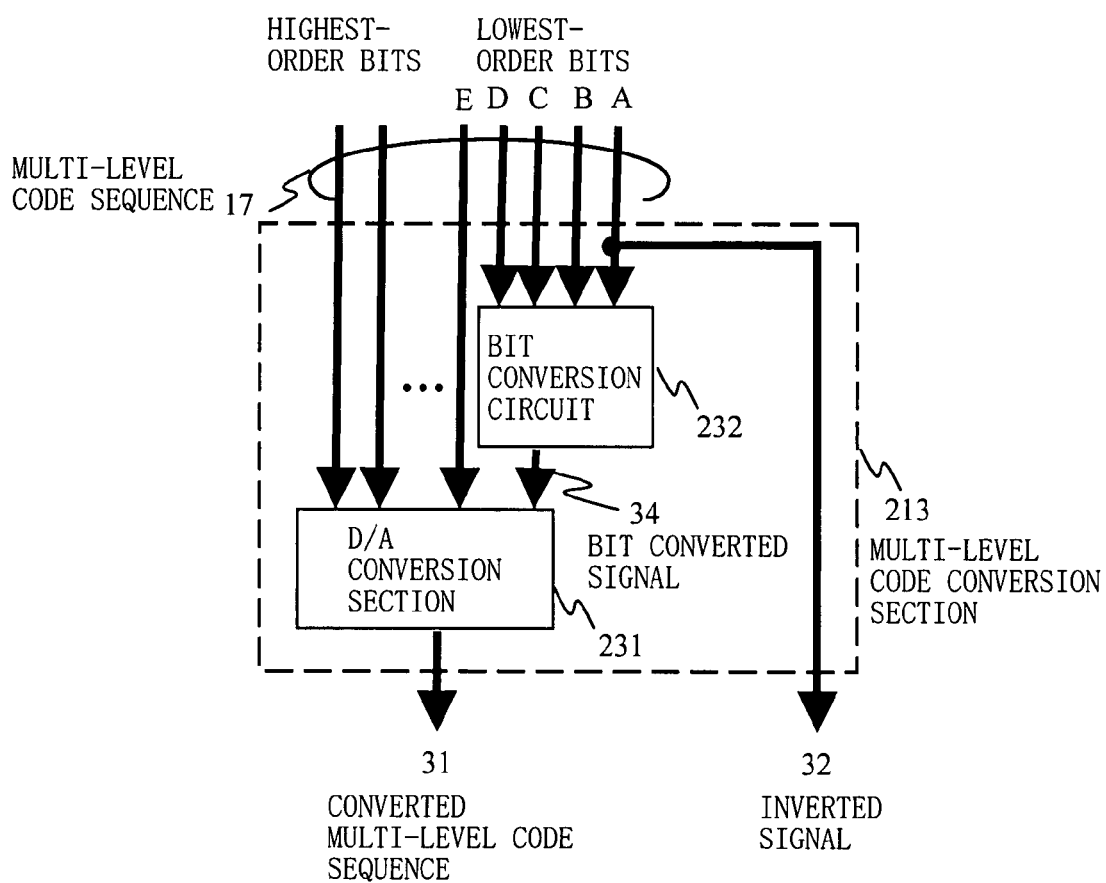
FIG. 7 is a block diagram showing a second exemplary configuration of the multi-level code conversion section 213 according to the first embodiment of the present invention.

FIG. 7 is a block diagram showing a second exemplary configuration of the multi-level code conversion section 213 according to the first embodiment of the present invention. In a configuration shown in FIG. 7 as well, the multi-level code sequence 17 is in the parallel signal form, and the converted multi-level code sequence 31 is in the multi-level serial signal form. The multi-level code conversion section 213 includes the D/A conversion section 231 and the bit conversion circuit 232. To the bit conversion circuit 232, some bits of the multi-level code sequence 17 are inputted. The bit conversion circuit 232 outputs a bit converted signal 34 which is a binary signal having a bit rate which is equal to the symbol rate of the multi-level code sequence 17. A value of the bit converted signal 34 is decided based on the logical operation using respective bits to be inputted to the bit conversion circuit 232. That is, the bit conversion circuit 232 converts the inputted bits in accordance with the logical operation, and outputs the bit converted signal 34 having a bit count smaller than the inputted bit count.

To the D/A conversion section 231, bits of the multi-level code sequence 17 which are not inputted to the bit conversion circuit 232, and the bit converted signal 34 are inputted. The D/A conversion section 231 performs the digital/analog conversion of the bits of the multi-level code sequence 17 which are not inputted to the bit conversion circuit 232, and the bit converted signal 34, and outputs the converted multi-level code sequence 31. Further, a bit of the multi-level code sequence 17 which has the same arrangement as the bit inputted to the exclusive-OR circuit 121 at the transmitting end (the lowest-order bit in an example shown in FIG. 6) is outputted as it is as the inverted signal 32. The inverted signal 32 may be arbitrarily selected from the bits of the multi-level code sequence 17 which are to be inputted to the bit conversion circuit 232 (A, B, C, and D in the drawing). However, a bit, which has the same arrangement as the bit inputted to the exclusive-OR circuit 121 at the transmitting end, needs to be selected.

The configuration of the multi-level processing section 112, the level conversion section 113, and the multi-level code conversion section 213 shown in each of FIGS. 4 to 7 is merely an example. Setting of bits not to be used, or setting of bits to be inputted to the bit conversion circuits 132 and 232 may be performed arbitrarily other than the example above described as long as the settings are uniform at transmitting and receiving ends.

Further, component parts shown in FIGS. 4 to 7 may be replaced with other elements each having a similar function. Further, the component parts other than the D/A conversion sections 131 and 231 are not limited to hardware, and functions of the component parts may be realized by software processing.

With respect to a receiving section used by a legitimate receiving party, as long as deterioration in a signal-to-noise ratio is tolerable, the configuration of the receiving section 201 shown in FIG. 1 may be replaced with a receiving section having the same configuration as a conventional art. In the case where the receiving section having the same configuration as the conventional art is used, deterioration in a signal level (that is, deterioration in the signal-to-noise ratio) occurs, the deterioration corresponding to a difference in decision level between the receiving section 201 of the present embodiment and the receiving section having the same configuration as the conventional art. Therefore, as long as the deteriorated signal-to-noise ratio is within a specification of the receiving section 201, the receiving section having the same configuration as the conventional art may be used.

As above described, according to the first embodiment of the present invention, even in the case where the noise level is not large enough with respect to the step width of the converted multi-level signal 33, it is possible to increase the number of attempts of the decryption by the eavesdropper, compared to a case where the eavesdropper can uniquely identify a received sequence. Accordingly, it is possible to improve safety against the eavesdropping without complicating a hardware configuration.

Second Embodiment

Figure 8:
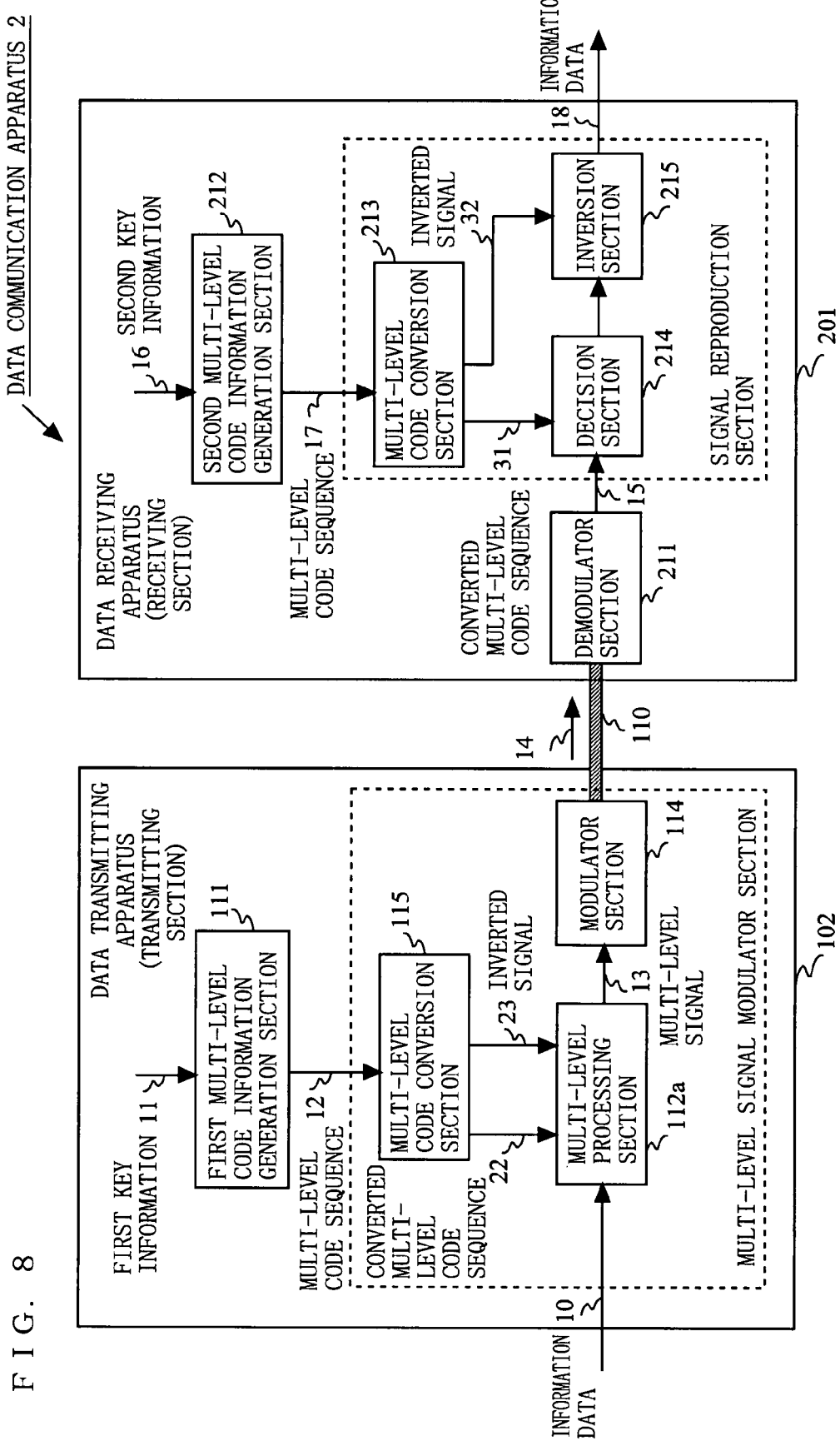
FIG. 8 is a block diagram showing an exemplary configuration of a data communication apparatus 2 according to a second embodiment of the present invention.

FIG. 8 is a block diagram showing an exemplary configuration of a data communication apparatus 2 according to a second embodiment of the present invention. As shown in FIG. 8, the data communication apparatus 2 has a configuration in which a data transmitting apparatus (hereinafter referred to as a transmitting section) 102, and a data receiving apparatus (hereinafter referred to as a receiving section) 201 are connected to each other via a transmission line 110. The transmitting section 102 includes a first multi-level code generation section 111, a multi-level processing section 112a, a modulator section 114, and a multi-level code conversion section 115. A configuration and an operation of the receiving section 201 are the same as those described in the first embodiment, and thus description thereof will be omitted. In FIG. 8, although an eavesdropper receiving section 301 is not described, it will be supposed that the eaves dropper will attempts eaves dropping by using a method described in the first embodiment.

The first multi-level code generation section 111 sets the first key information 11 as an initial value, and generates and outputs a multi-level code sequence 12, which is a multi-level pseudo random number series. A signal form of the multi-level code sequence 12 may be either a multi-level serial signal or a binary parallel signal. The multi-level code conversion section 115 generates and outputs, from the multi-level code sequence 12, a converted multi-level code sequence 22 and an inverted signal 23. The converted multi-level code sequence 22 is a signal which has the same symbol rate as the multi-level code sequence 12, and has a multi-level number smaller than a multi-level number of the multi-level code sequence 12. Further, the inverted signal 32 is a binary signal having a bit rate which is equal to a symbol rate of the multi-level code sequence 12. The multi-level processing section 112 generates, based on a predetermined procedure, a multi-level signal 13 having a level corresponding to a combination of a signal level of each of the information data 10, the converted multi-level code sequence 22, and the inverted signal 23. The modulator section 114 modulates the multi-level signal 13 in a predetermined modulation method, and transmits the modulated signal 14 to the transmission line 110.

In the transmitting section 102, the multi-level processing section 112a, the modulator section 114, and the multi-level code conversion section 115 may be collectively described as a multi-level signal modulator section. In the receiving section 201, the multi-level code conversion section 213, the decision section 214, and the inversion section 215 may be collectively described as a signal reproduction section.

Next, with reference to FIG. 9, relation of a signal level arrangement of each of the information data 10, the multi-level code sequence 12, the converted multi-level code sequence 22, the inverted signal 23, and the multi-level signal 13 will be described. FIG. 9 is a schematic diagram illustrating a signal level arrangement in the second embodiment of the present invention. In FIG. 9, values of the multi-level code sequence 12 are each represented by a binary number (numbers in parentheses are each described in a decimal number). The multi-level code conversion section 213 divides values of the multi-level code sequence into several groups, and allocates values of the converted multi-level code sequence 22 to respective groups. In an example shown in FIG. 9, the multi-level code conversion section 213 allocates a value of the converted multi-level code sequence 22 '0' to values of the multi-level code sequence 12 "0111", "0110", "0101", "0100", "0011", "0010", "0001", and "0000". The multi-level code conversion section 213 also allocates a value of the converted multi-level code sequence 22 "1" to the remaining values of the multi-level code sequence 12. The multi-level code conversion section 213 also allocates a value of the inverted signal 23 "1" or "0" to each of the values of the multi-level code sequence 12. Each of the values of the inverted signal 23 is allocated evenly within each of the several groups. In the example shown in FIG. 9, the multi-level code conversion section 213 allocates the same value as a lowest-order bit of the multi-level code sequence 12 as the value of the inverted signal 23.

The multi-level processing section 112*a* determines a signal level of the multi-level signal 13 in accordance with a value of each of the converted multi-level code sequence 22, the inverted signal 23, and the information data 10. Note that the multi-level number of the multi-level signal 13 is twice as many as the multi-level number of the converted multi-level code sequence 22. First, the multi-level processing section 112*a* allocates each of the values of the converted multi-level code sequence 22 to two signal levels of the multi-level signal 13. In this case, the multi-level processing section 112*a* allocates one of the signal levels of the converted multi-level code sequence 22 to a larger half of the signal levels (hereinafter referred to as an upper half), and allocates the other signal level of the converted multi-level code sequence 22 to a smaller half of the signal levels (hereinafter referred to as a lower half). A difference between the signal levels is constant independently of the value of the converted multi-level code sequence 22.

Next, the multi-level processing section 112*a* calculates an exclusive-OR (XOR) of the information data 10 and the inverted signal 23. In the case where the calculated XOR is "1", the signal levels of the upper half is allocated to the multi-level signal 13, and in the case where the calculated XOR is "0", the signal levels of the lower half is allocated to the multi-level signal 13. The modulated signal 14 is obtained by modulating the multi-level signal 13 which had been obtained through the XOR calculation, and the modulated signal 14 has the same signal format as that described in the first embodiment. Therefore, the receiving section 201 can demodulate the modulated signal 14 in the same procedure as the first embodiment. An effect against the eavesdropping is also the same as described in the first embodiment.

In FIG. 9, the multi-level number of the multi-level code sequence 12 is 16 (a bit count is 4), and the overlapping number of is 8. However, such description is merely an example, and different values may be used. The larger the overlapping number is set, the further the number of attempts of the decryption by the eavesdropper will be increased. Note that the overlapping number needs to be set so as not to exceed the multi-level number of the multi-level code sequence 12. The relation among the information data 10, the multi-level code sequence 12, the converted multi-level code sequence 22, the inverted signal 23, and the multi-level signal 13 as shown in FIG. 9 is merely an example, and a different relation may be applicable. Even in such case, the value of the inverted signal 23 needs to be allocated evenly in a group of the multi-level code sequence 12 which is allocated to each of the value of the converted multi-level code sequence 22.

Figure 10:
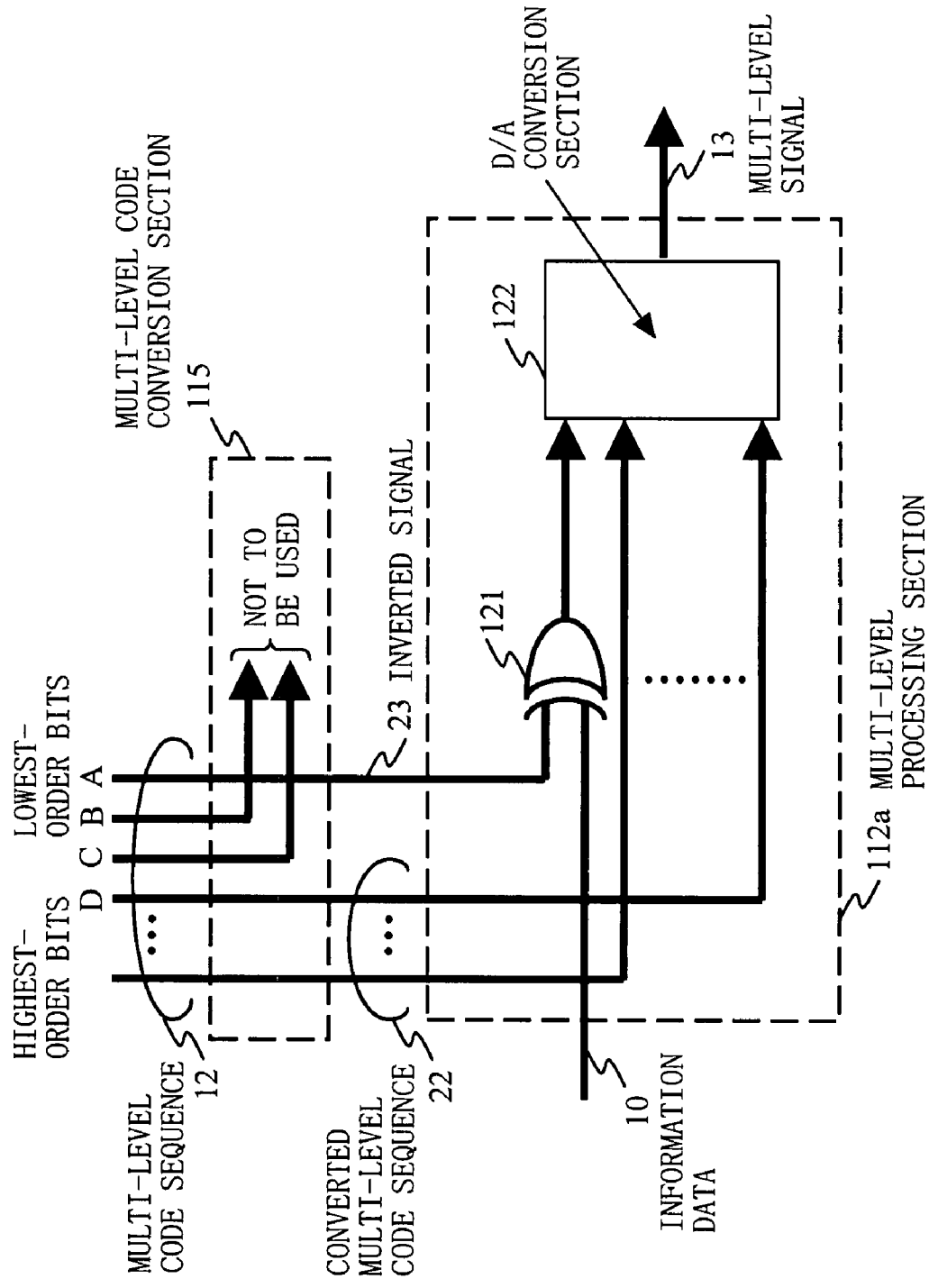
FIG. 10 is a block diagram showing a first exemplary configuration of a multi-level processing section 112a and a level conversion section 113 according to the second embodiment of the present invention.

Next, a specific configuration of the multi-level processing section 112*a* and the multi-level code conversion section 115 will be described. FIG. 10 is a block diagram showing a first exemplary configuration of the multi-level processing section 112*a* and the level conversion section 113 according to the second embodiment of the present invention. According to a configuration shown in FIG. 10, the multi-level code sequence 12 and the converted multi-level code sequence 22 are each in a parallel signal form, and the multi-level signal 13 is in a multi-level serial signal form. The multi-level code conversion section 115 outputs remaining bits after subtracting some bits from the multi-level code sequence 12 as the converted multi-level code sequence 22, and also outputs the lowest-order bit of the multi-level code sequence 12 (A in the drawing) as it is as the inverted signal 23. The multi-level processing section 112*a* includes an exclusive-OR circuit 121 and a D/A conversion section 122.

The exclusive-OR circuit 121 performs an exclusive-OR operation between the information data 10 and the inverted signal 23, and outputs a result of the operation. To the D/A conversion section 122, a signal outputted by the exclusive-OR circuit 121 is inputted as a highest-order bit, and respective bits of the converted multi-level code sequence 22 is inputted as other bits than the highest-order bit. The D/A conversion section 121 performs a digital/analog conversion of the inputted bits, and outputs the multi-level signal 13. In FIG. 10, although the lowest-order bit of the multi-level code sequence 12 is used as the inverted signal 23, any one bit may be arbitrarily selected as the inverted signal 23 from bits (A, B, and C in the drawing) which are not used as the converted multi-level code sequence 22.

Figure 11:
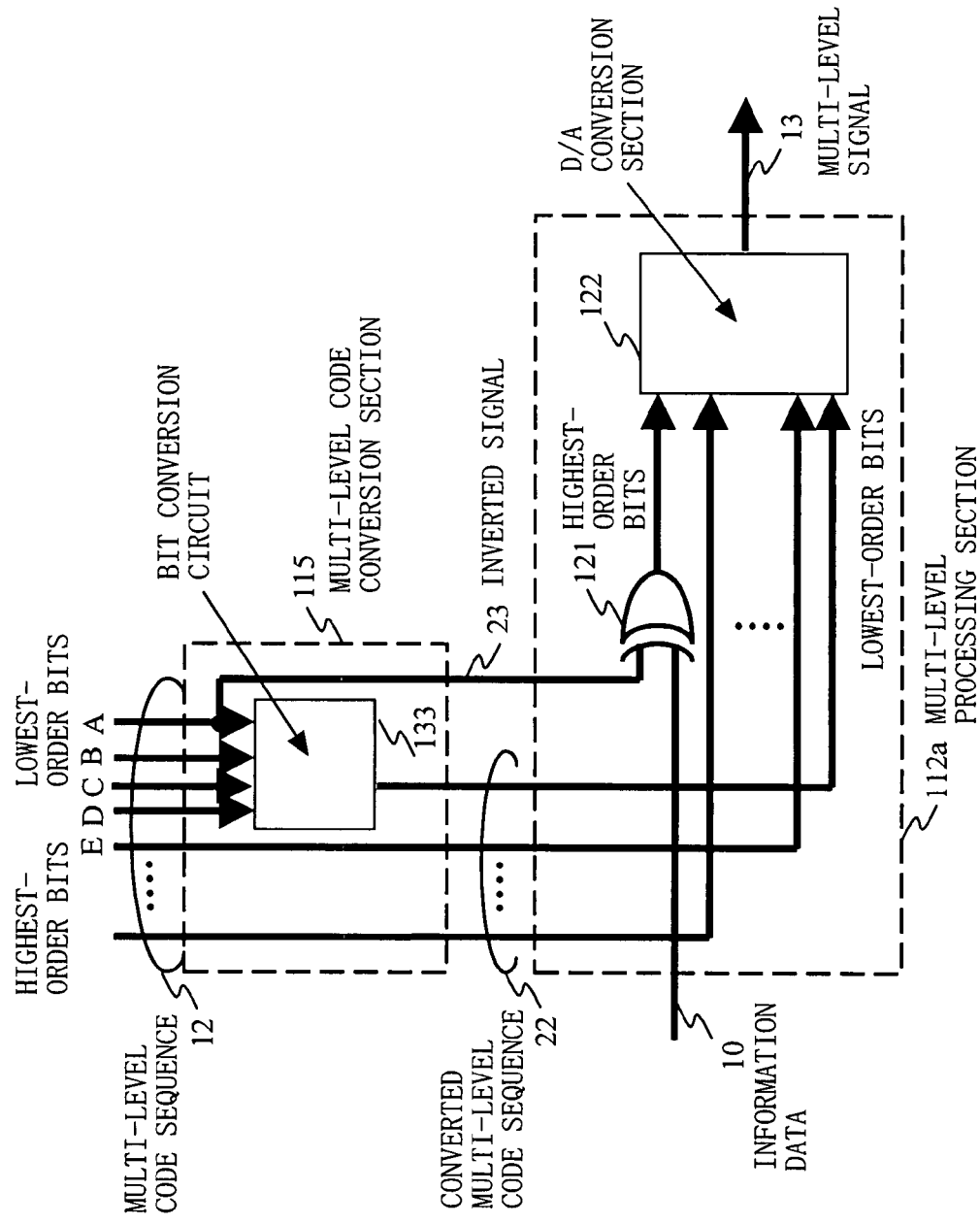
FIG. 11 is a block diagram showing a second exemplary configuration of the multi-level processing section 112a and the level conversion section 113 according to the second embodiment of the present invention.

FIG. 11 is a block diagram showing a second exemplary configuration of the multi-level processing section 112*a* and the level conversion section 113 according to the second embodiment of the present invention. In a configuration shown in FIG. 11, the multi-level code sequence 22 and the converted multi-level code sequence 22 are each in a parallel signal form, and the multi-level signal 13 is in a multi-level serial signal form. The multi-level code conversion section 115 includes a bit conversion circuit 133. To the bit conversion circuit 133, some bits of the multi-level code sequence 12 are inputted, and the bit conversion circuit 133 outputs a binary signal having a bit rate equal to the symbol rate of the multi-level code sequence 12. A value of the signal outputted by the bit conversion circuit 133 is determined in accordance with a logical operation using the respective bits inputted to the bit conversion circuit 133.

The signal outputted by the bit conversion circuit 133 is combined with the remaining bits of the multi-level code sequence 12 which are not inputted to the bit conversion circuit 133, and then outputted as the converted multi-level code sequence 22. Further, the multi-level code conversion section 115 outputs the lowest-order bit (A in the drawing) of the multi-level code sequence 12 as it is as the inverted signal 23. A configuration of the multi-level processing section 112 is the same as that shown in FIG. 10. In FIG. 11, although the lowest-order bit of the multi-level code sequence 12 is used as the inverted signal 23, any bit may be arbitrarily selected as the inverted signal 23 from bits (A, B, C, and D in the drawing) which are inputted to the bit conversion circuit 133.

Figure 12:
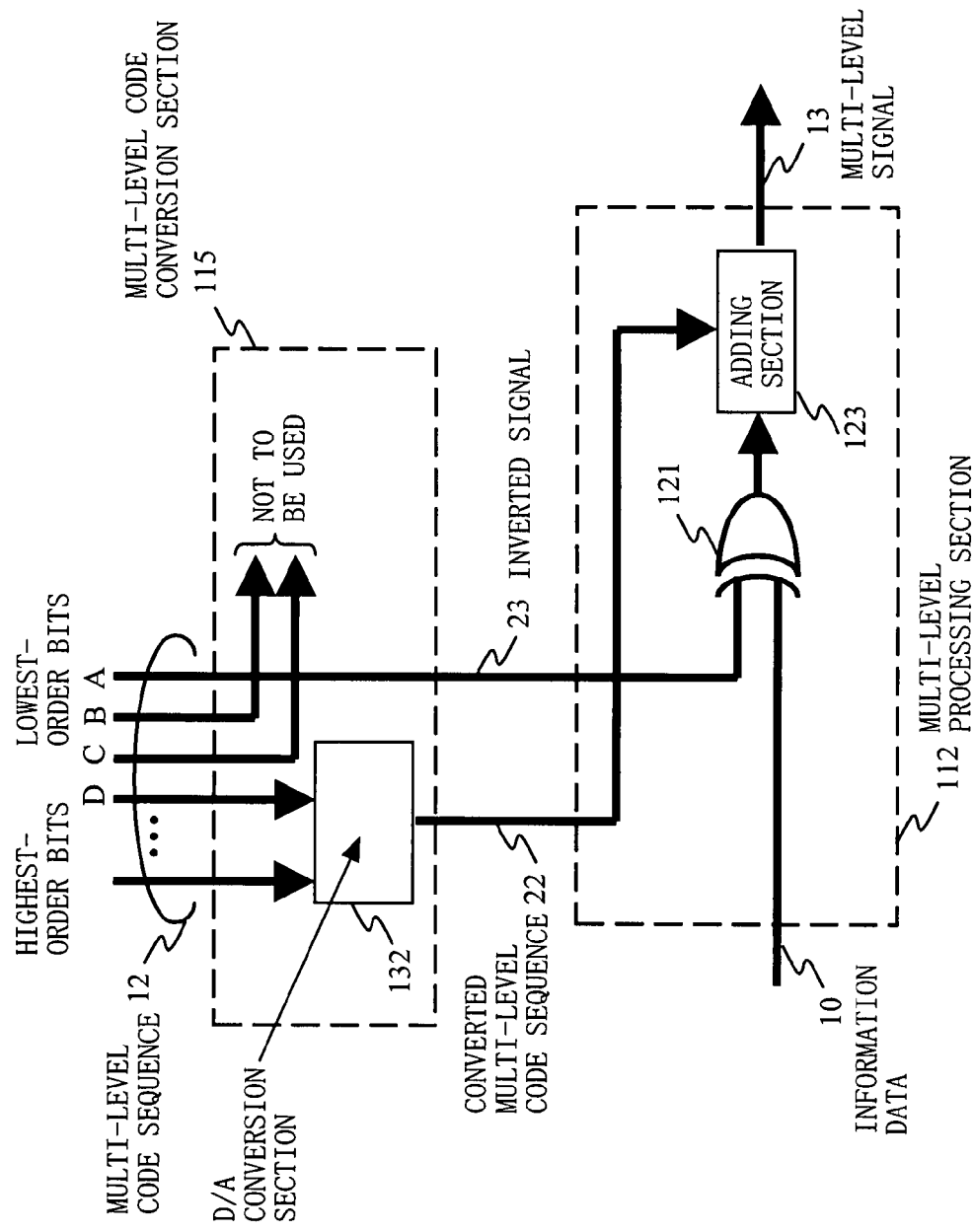
FIG. 12 is a block diagram showing a third exemplary configuration of the multi-level processing section 112a and the level conversion section 113 according to the second embodiment of the present invention.

FIG. 12 is a block diagram showing a third exemplary configuration of the multi-level processing section 112*a* and the level conversion section 113 according to the second embodiment of the present invention. In a configuration shown in FIG. 12, the multi-level code sequence 12 is in a parallel signal form, and the converted multi-level code sequence 22 and the multi-level signal 13 are each in a multi-level serial signal form. The multi-level code conversion section 115 includes the D/A conversion section 122. To the D/A conversion section 122, remaining bits after subtracting some bits from the multi-level code sequence 12 are inputted. The D/A conversion section 122 performs the digital/analog conversion of the inputted bits, and outputs the converted multi-level code sequence 22, and also outputs one of the remaining bits of the multi-level code sequence 12 (the lowest-order bit in an example shown in FIG. 12) as it is, as the inverted signal 23.

The multi-level processing section 112 includes the exclusive-OR circuit 121 and an adding section 123. The exclusive-OR circuit 121 performs the exclusive-OR operation between the information data 10 and the inverted signal 23, and outputs a result of the operation. The adding section 123 adds a signal outputted by the exclusive-OR circuit 121 to the converted multi-level code sequence 22, and outputs the multi-level signal 13. In FIG. 12, although the lowest-order bit of the multi-level code sequence 12 is used as the inverted signal 23, any bit may be arbitrarily selected as the inverted signal 23 from bits (A, B, and C in the drawing) which are not used as the converted multi-level code sequence 22. Further, although not shown, in order to adjust the signal outputted by the exclusive-OR circuit 121 and a signal of the converted multi-level code sequence 22, an amplifier or an attenuator may be provided to an input side of the adding section 123.

Further, although not shown, as an exemplary configuration of the multi-level processing section 112 and the multi-level code conversion section 115, a bit conversion circuit may be provided in the inside of the multi-level code conversion section 115 in the configuration shown in FIG. 12, in the same manner as FIG. 11.

The configuration of the multi-level processing section 112 and the multi-level code conversion section 115 shown in each of FIGS. 10 to 12 is merely an example. As long as a setting of the bits not to be used, and a setting of bits to be inputted to the bit conversion circuits 132 and 232 are unified at a transmitting end and a receiving end, any additional settings may be made arbitrarily.

Component parts shown in each of FIGS. 10 to 12 may be replaced with different elements each having a similar function. Further, the component parts other than the D/A conversion section 122 and the adding section 123 are not limited to hardware, and the function thereof may be realized by software processing.

As above described, according to the second embodiment of the present invention, in the same manner as the first embodiment, even in the case where a noise level is not large enough with respect to a step width of the multi-level signal 15, it is possible to increase the number of the attempts of the decryption by the eavesdropper. Accordingly, it is possible to improve safety against the eavesdropping without complicating a hardware configuration.

Third Embodiment

Figure 13A:
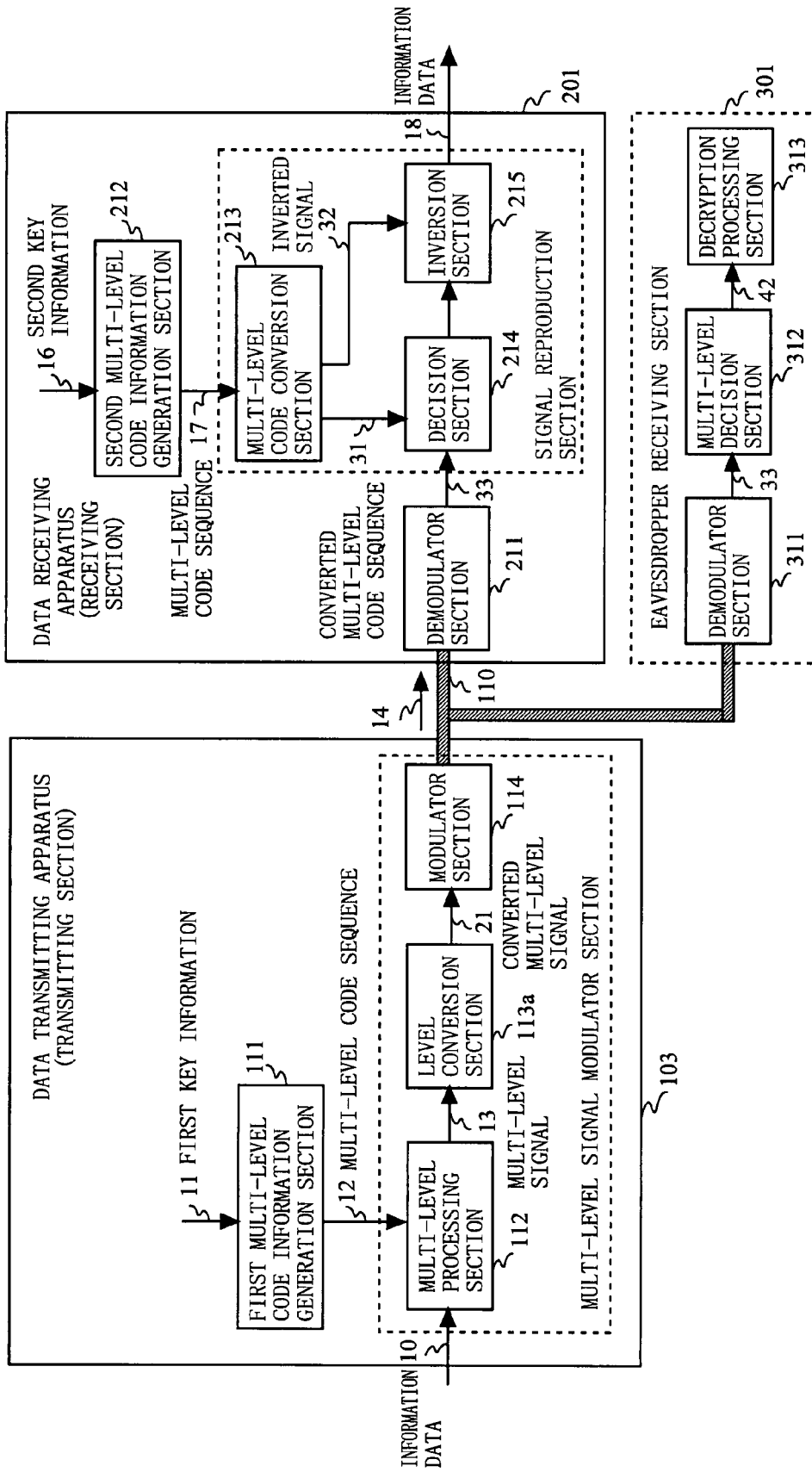
FIG. 13A is a block diagram showing an exemplary configuration of a data communication apparatus 3 according to a third embodiment of the present invention.

FIG. 13A is a block diagram showing an exemplary configuration of the data communication apparatus 3 according to a third embodiment of the present invention. As shown in FIG. 13A, the data communication apparatus 3 has a configuration in which a data transmitting apparatus (hereinafter referred to as a transmitting section) 103 and a data receiving apparatus (hereinafter referred to as a receiving section) 201 are connected to each other via a transmission line 110. An overall configuration of the data communication apparatus 3 according to the third embodiment is basically similar to that described in the first embodiment with reference to FIG. 1. In the transmitting section 103, only an internal configuration of a level conversion section 113a is different from that of the first embodiment. In the present embodiment, only those parts which are different from the first embodiment will be described, and description of function blocks which operate in the same manner as the first embodiment will be omitted.

Figure 13B:
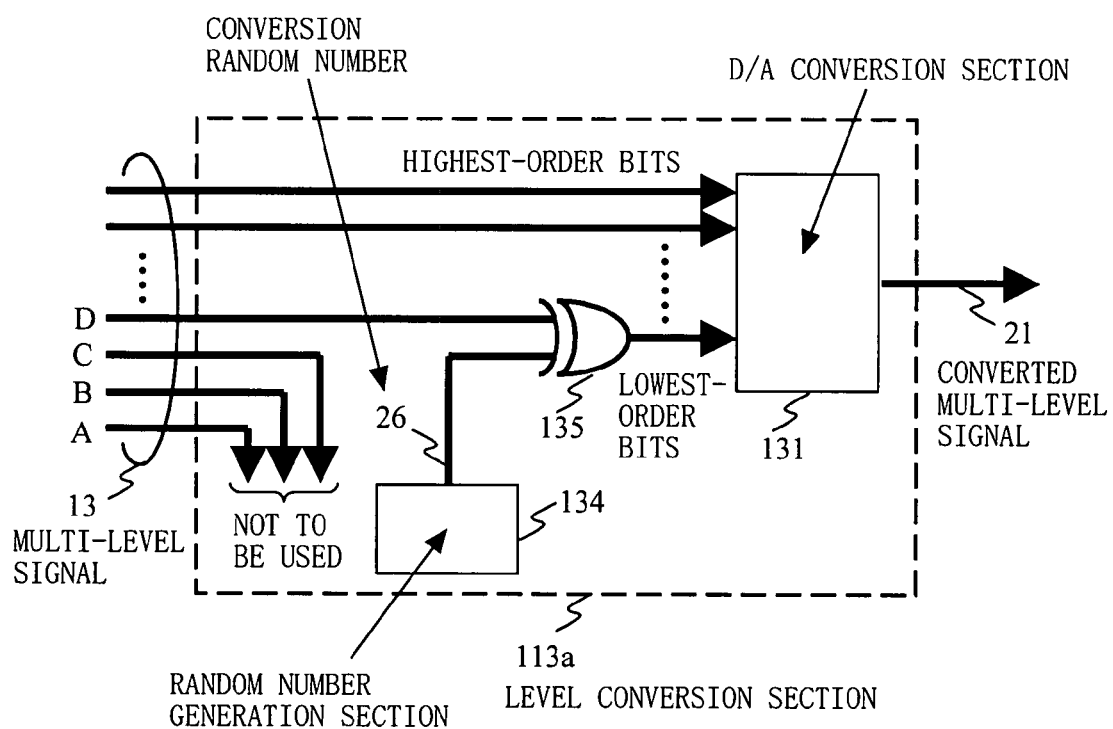
FIG. 13B is a block diagram showing an exemplary configuration of a level conversion section 113a according to the third embodiment of the present invention.

FIG. 13B is a block diagram showing an exemplary configuration of the level conversion section 113a according to the third embodiment of the present invention. In FIG. 13B, the level conversion section 113 includes a D/A conversion section 131, and a random number generation section 134, and an exclusive-OR circuit 135. The random number generation section 134 generates and outputs a conversion random number 26, which is a binary random number. As the conversion random number 26, either of a physical random number which is generated based on physical phenomenon, or a pseudo random number which is mathematically generated based on an initial value is used. In the case of using the pseudo random number, the initial value is not open to public except for a receiving party. The exclusive-OR circuit 135 performs an exclusive-OR operation between a lowest-order bit (D in the drawing) of a multi-level signal 13 except for those bits (A, B, and C in the drawing) which are not to be used and the conversion random number 26, and outputs a result of the operation. The D/A conversion section 131 performs a digital/analog conversion of the inputted bit, and outputs a converted multi-level signal 21.

Figure 14:
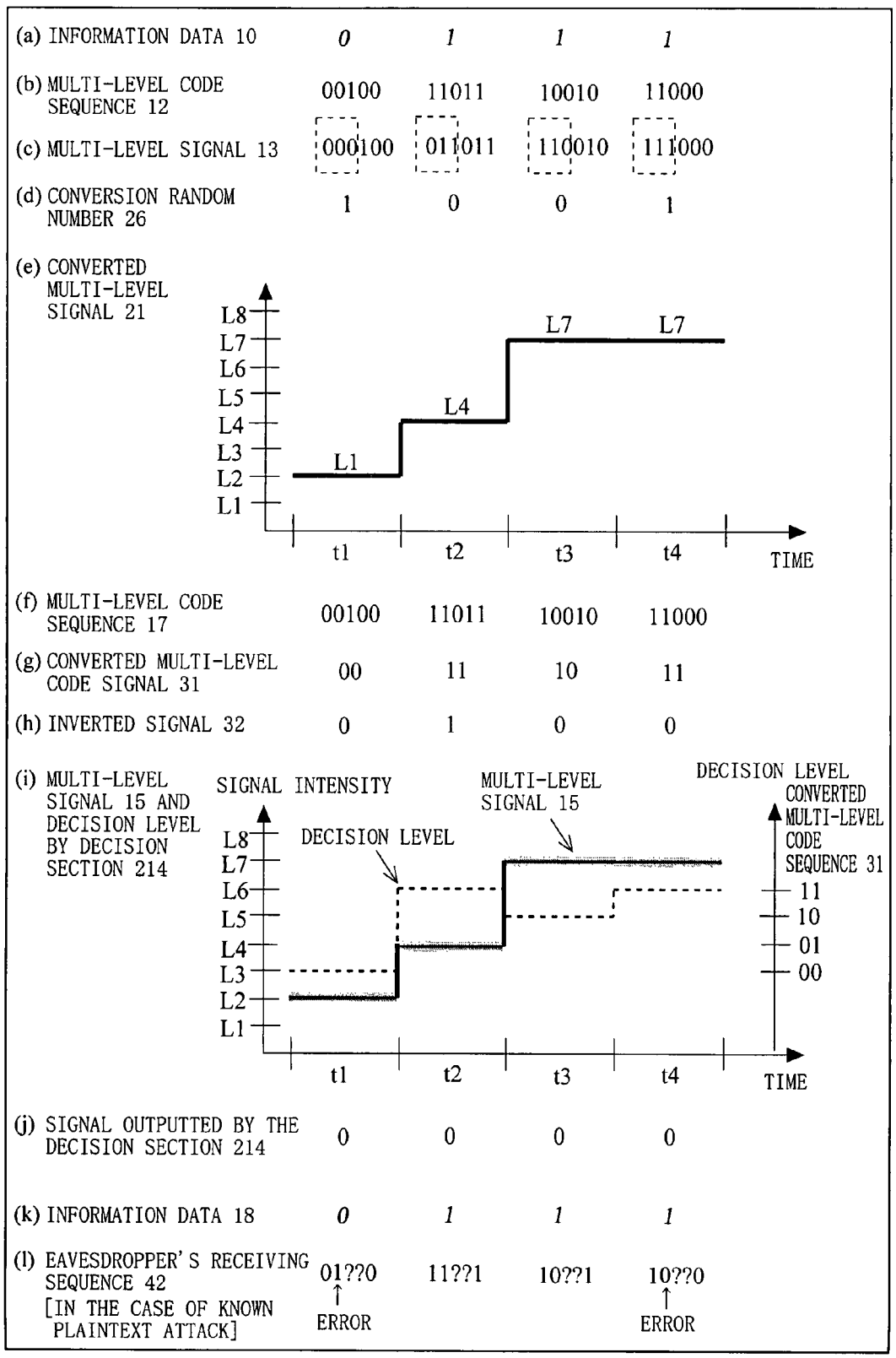
FIG. 14 is a schematic diagram illustrating a signal form used for the data communication apparatus 3 according to the third embodiment of the present invention.

Next, a signal form used in the present embodiment will be described by using FIG. 14 as an example. FIG. 14 is a schematic diagram illustrating a signal form used for the data communication apparatus 3 according to the third embodiment of the present invention. The signal form shown in FIG. 14 is an example of a case where the multi-level number of a multi-level code sequence 12 is 16 (5 bit), and the overlapping number is 8. In the case where information data 10 and the multi-level code sequence 12 take values shown in (a) and (b) of FIG. 14, the multi-level signal 13 takes values shown in FIG. 14(c). Here, a case where the conversion random number 26 takes values shown in FIG. 14(d) will be considered.

The level conversion section 113a does not use three lowest-order bits of the multi-level signal 13, and only uses three highest-order bits (bits surrounded with a dotted square in FIG. 14(c)). The exclusive-OR circuit 135 performs the exclusive-OR operation between a third highest-order bit, among the bits surrounded with the dotted square, and the conversion random number 26, and outputs a result of the operation. The D/A conversion section 131 performs the digital/analog conversion of the remaining two highest-order bits of the multi-level signal 13 and a signal outputted by the exclusive-OR circuit 135, and determines a level of the converted multi-level signal 21. At the receiving end, information data is reproduced in the same manner as the first embodiment (see (f), (g), (h), (i), (j), and (k) of FIG. 14).

Next, an effect of the present embodiment against the eavesdropping will be described. Suppose that the eavesdropper attempts a known plaintext attack using an eavesdropper receiving section 301. As with the first embodiment, the eavesdropper receiving section 301 cannot narrow down a possible value of the multi-level code sequence 12 (in the case of FIG. 14, the possibility of four patterns remains), and thus values of some bits of a received sequence 42 is unknown. Further, in the present embodiment, at time slots in which the value of the conversion random number 26 is "1", an error occurs in another bit in the received sequence 42 (equivalent to a bit of the multi-level signal 13 on which the exclusive-OR operation is performed together with the conversion random number 26, that is, a second highest-order bit, in the case of FIG. 14(l)). The eavesdropper receiving section 301 does not include information of the conversion random number 26, and thus this bit is also uncertain for the eavesdropper. Therefore, the possibility remains that the number of patterns of the value which the multi-level code sequence 12 may take will be twice as many as that in the case where the conversion random number 26 is not used. That is, the number of patterns will be eight patterns. In this manner, the number of patterns of the value which the multi-level code sequence 12 may take increases further, whereby it is possible to increase the number of the attempts of the decryption further than the case of the first embodiment.

In FIG. 14, although the multi-level number of the multi-level code sequence 12 is 16 (5 bit), and the overlapping number thereof is 8, these are merely examples, and different values may be used. With respect to the bit of the multi-level signal 13 to be inputted to the exclusive-OR circuit 135, any one bit may be used as long as the bit is not to be used (A, B, and C in the drawing), and as long as the bit is not the highest-order bit.

Further, a configuration of the level conversion section 113a shown in FIG. 13B is based on the configuration shown in FIG. 4. In order to obtain the above-described signal form, the level conversion section 113a according to the present embodiment may have a configuration (not shown) which is based on the configuration shown in FIG. 5 and additionally has a random number generation section and an exclusive-OR circuit. Further, as an overall configuration of the transmitting section 103 shown in FIG. 13A, a configuration similar to the transmitting section 102 (see FIG. 8) in the second embodiment may be used, and the random number generation section and the exclusive-OR circuit may be included in the inside of the multi-level code conversion section 115, whereby a similar effect can be obtained. In these configurations, respective configuration blocks may be replaced with different blocks each having a similar function. Further, component parts other than the digital/analog conversion section 131 may be replaced with software processing.

As above described, according to the third embodiment of the present invention, it is possible to further increase the computational complexity required for the decryption by the data eavesdropper than the first embodiment, and accordingly it is possible to improve safety against eavesdropping.

Fourth Embodiment

The present embodiment corresponds to a special case of the first embodiment or the second embodiment. In other words, the present embodiment corresponds to a case where the multi-level number and the overlapping number of the multi-level code sequence 12 are made equal to each other.

Figure 15:
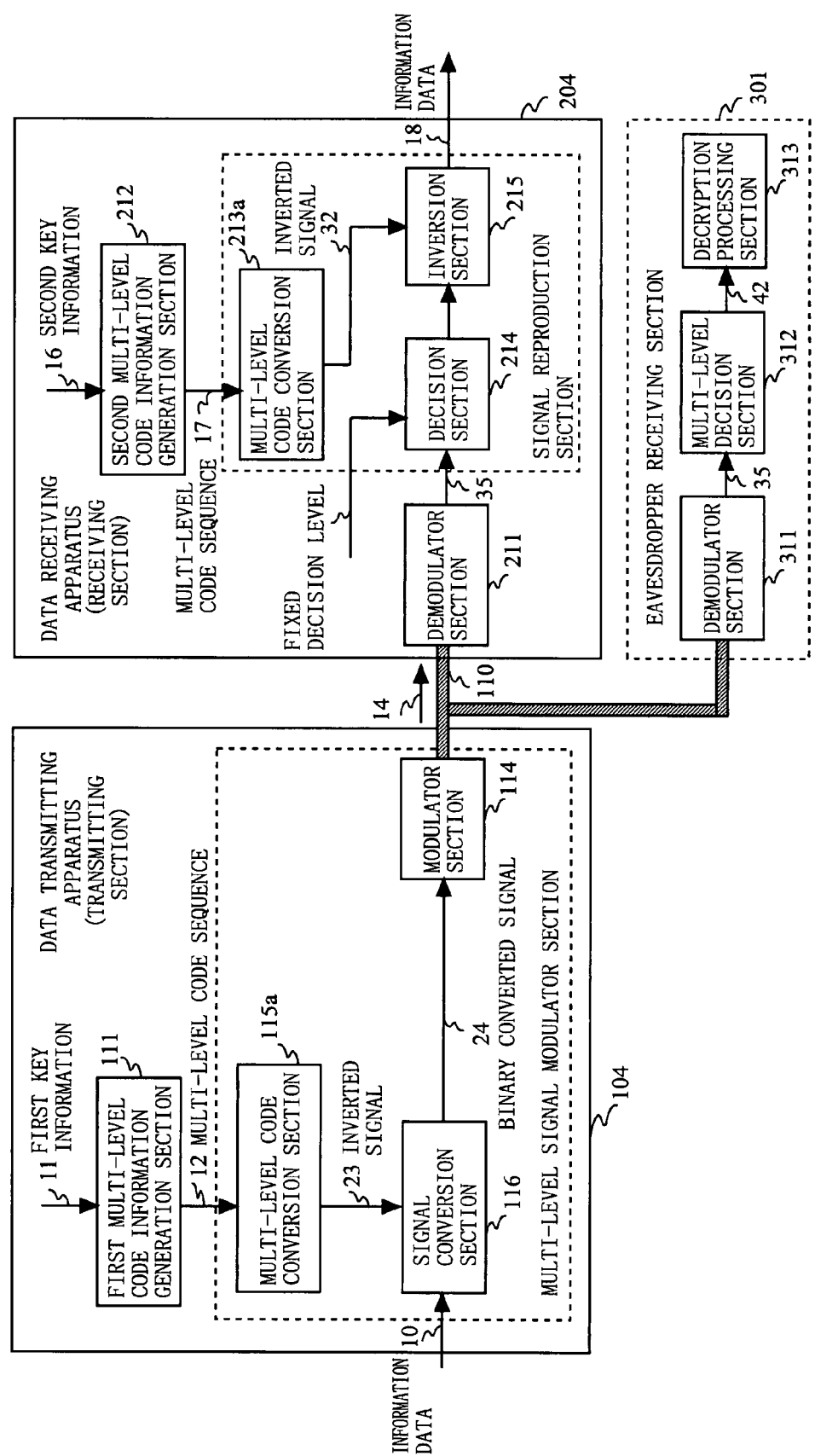
FIG. 15 is a block diagram showing an exemplary configuration of a data communication apparatus 4 according to a fourth embodiment of the present invention.

FIG. 15 is a block diagram showing an exemplary configuration of a data communication apparatus 4 according to a fourth embodiment of the present invention. As shown in FIG. 15, the data communication apparatus 4 has a configuration in which a data transmitting apparatus (hereinafter referred to as a transmitting section) 104 and a data receiving apparatus (hereinafter referred to as a receiving section) 204 are connected to each other via a transmission line 110. The transmitting section 104 includes a first multi-level code generation section 111, a modulator section 114, a multi-level code conversion section 115a, and a signal conversion section 116. The receiving section 204 includes a demodulator section 211, a second multi-level code generation section 212, a multi-level code conversion section 213a, a decision section 214, and an inversion section 215.

In the transmitting section 104, the first multi-level code generation section 111 sets first key information 11 as an initial value, and generates and outputs a multi-level code sequence 12, which is a multi-level pseudo random number series. A signal form of the multi-level code sequence 12 may be either a multi-level serial signal or a binary parallel signal. The multi-level code conversion section 115a generates and outputs, from the multi-level code sequence 12, an inverted signal 23. The signal conversion section 116 performs an exclusive-OR operation between information data 10 and the inverted signal 23, and outputs a result of the operation as a binary converted signal 24. The modulator section 114 modulates the binary converted signal 24 in a predetermined modulation method, and outputs a modulated signal 14 to the transmission line 110.

In the receiving section 204, the demodulator section 211 demodulates the modulated signal 14 transmitted via the transmission line 110, and reproduces a binary converted signal 35. In the same manner as the first multi-level code generation section 111, the second multi-level code generation section 212 sets second key information 16 as an initial value, and generates and outputs a multi-level code sequence 17, which is a multi-level pseudo random number series. The decision section 214 decides the binary converted signal 35 (binary decision), and outputs a result of the decision. A decision level of the decision section 214 is basically a fixed value, but not limited thereto in the case where a signal level of the binary converted signal is fluctuated for any reason. That is, the decision section 214 had a function of adjusting the decision level to an optimal value. The multi-level code conversion section 213a generates and outputs, from the multi-level code sequence 17, an inverted signal 32. The inversion section 215 performs the exclusive-OR operation between a signal outputted by the decision section 214 and the inverted signal 32, and outputs a result of the operation as information data 18.

Further, as shown in FIG. 15, a receiving apparatus assumed to be used by an eaves dropper is described as an eaves dropper receiving section 301. The eavesdropper receiving section 301 is described for the purpose of describing an effect of the present embodiment against eavesdropping, and is not included in the configuration of the data communication apparatus 4. A configuration and an operation of the eavesdropper receiving section 301 are the same as those described with reference to FIG. 25.

In the transmitting section 104, the signal conversion section 116, the modulator section 114, and the multi-level code conversion section 115a may be collectively described as a multi-level signal modulator section. Further, in the receiving section 204, the multi-level code conversion section 213a, the decision section 214, and the inversion section 215 may be collectively described as a signal reproduction section.

Next, with regard to a method of setting a signal in the present embodiment will be described with reference to FIGS. 16 and 17. FIG. 16 is a diagram showing an exemplary relation between the multi-level code sequence 12 and the inverted signal 23 according to the fourth embodiment of the present invention. The inverted signal 23 is a binary signal having a bit rate which is equal to a symbol rate of the multi-level code sequence 12. A value of the inverted signal 23 is set to the same value as a lowest-order bit of the multi-level code sequence 12. FIG. 17 is a diagram showing a relation among the information data 10, the inverted signal 23, and the binary converted signal 24 according to the fourth embodiment of the present invention. A value of the binary converted signal 24 is determined in accordance with the exclusive-OR operation between the information data 10 and the inverted signal 23. The binary converted signal 24 obtained as above described is equivalent to a case where a plurality of levels of combinations of the information data 10 and the multi-level code sequence 12 are allocated to one level of a converted multi-level signal 21, as described in the first embodiment, in an overlapped manner, the plurality of levels of combinations being the same number (16 in this case) as the multi-level number of the multi-level code sequence 12.

Next, a signal form used in the present embodiment will be described with reference to FIG. 18. FIG. 18 is a schematic diagram illustrating a signal form used for the data communication apparatus 4 according to the fourth embodiment of the present invention. In FIG. 18, a case will be considered where values of the information data 10 and values of the multi-level code sequence 12 in respective time slots (t1 to t4) are those shown in (a) to (b) of FIG. 18. In this case, the binary converted signal 24 takes respective values shown in FIG. 18(d) in accordance with the relations shown in FIGS. 16 and 17. The modulator section 114 modulates the binary converted signal 24 and outputs a modulated signal 14.

On the other hand, in the receiving section 204, the multi-level code conversion section 213a generates the inverted signal 32 in accordance with the same procedure as the transmitting section 104 (see FIG. 18(e)). The decision section 214 sets a decision level in accordance with a fixed decision level, and decides, in binary form, a binary converted signal 35 which is obtained by demodulating the modulated signal 14. The inversion section 215 performs the exclusive-OR operation between a signal outputted by the decision section 214 and the inverted signal 32, and outputs a result of the operation as the information data 18 (see FIG. 18(f)).

Next, the effect of the present embodiment against the eavesdropping will be described. Suppose that the eavesdropper attempts a known plaintext attack by using the eavesdropper receiving section 301. In the eaves dropper receiving section 301, the demodulator section 311 demodulates the modulated signal 14 which is obtained after having been branched off from the transmission line 110, and reproduces the binary converted signal 35. The multi-level decision section 312 can identify a value of the binary converted signal 35, but cannot identify a combination of the multi-level code sequence 12 and the information data 10. Therefore, the eavesdropper checks the binary converted signal 35 with a previously obtained value of the information data 10, and narrows down a possible value of the multi-level code sequence 12. However, the possibility still remains that the multi-level code sequence 12 may take eight patterns of values (equivalent to a half of the multi-level number of the multi-level code sequence 12).

That is, as shown in FIG. 18(g), values of bits of a received sequence 42 are unknown except for one bit (the lowest-order bit in the case of an example shown in FIG. 18). In each of the time slots thereafter as well, the possibility remains that the multi-level code sequence 12 may take eight patterns of values. Accordingly, the eavesdropper needs to perform decryption processing with respect to all possible patterns of values which the multi-level code sequence 12 may take. Therefore, compared to a case where the eavesdropper can identify a value of the received sequence 42 uniquely, the number of attempts of the decryption, that is, computational complexity required for the decryption is increased. As a result, it is possible to improve safety against eavesdropping.

In FIGS. 16 to 18, although the multi-level number of the multi-level code sequence 12 is 16 (a bit count is 4), this is merely an example, and a different value may be used.

Figure 19:
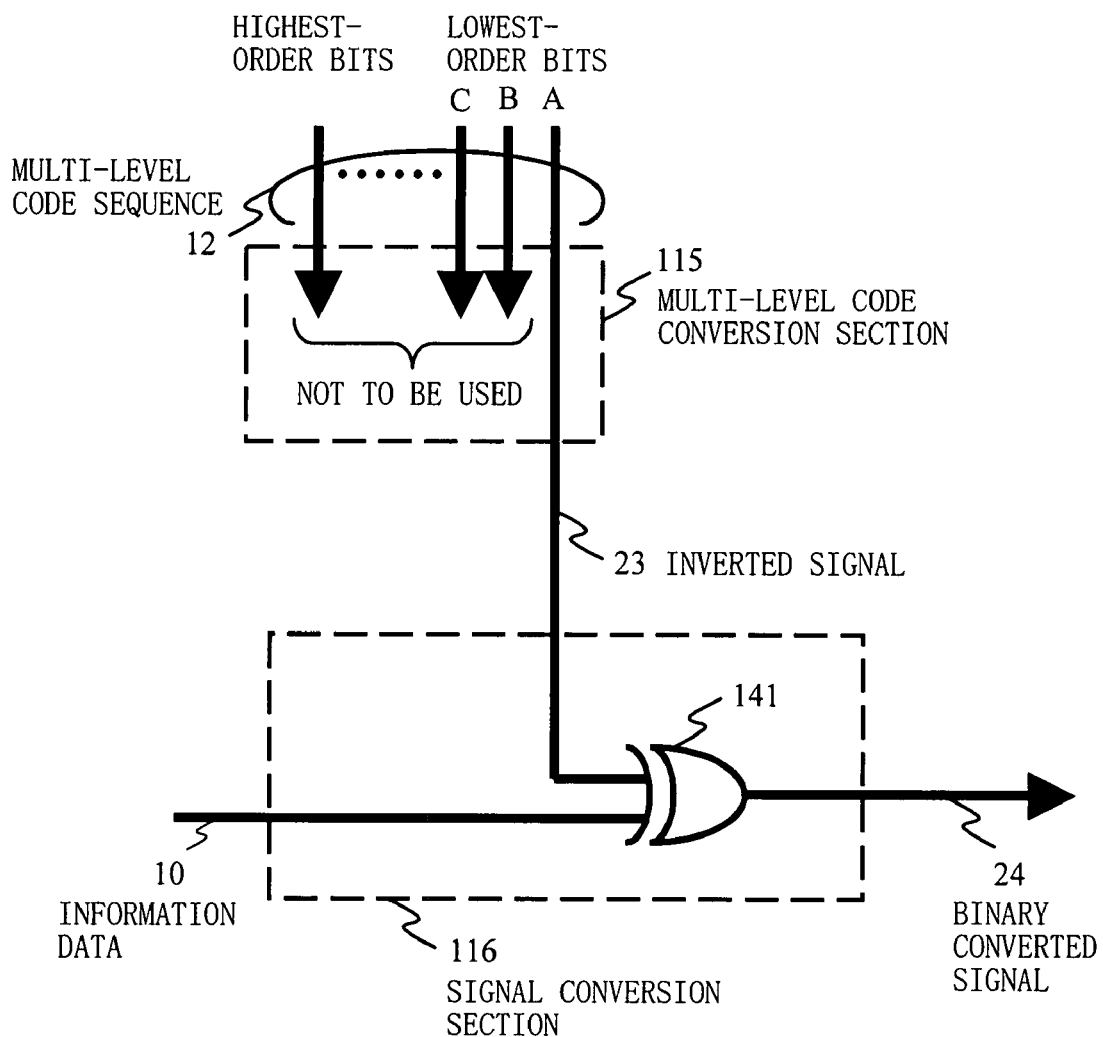
FIG. 19 is a block diagram showing an exemplary configuration of a multi-level code conversion section 115a and a signal conversion section 116 according to the fourth embodiment of the present invention.

Next, a specific configuration of the multi-level code conversion section 115a and the signal conversion section 116 will be described. FIG. 19 is a block diagram showing an exemplary configuration of the multi-level code conversion section 115a and the signal conversion section 116 according to the fourth embodiment of the present invention. According to the configuration shown in FIG. 19, the multi-level code sequence 12 is in a parallel signal form. The multi-level code conversion section 115a outputs the lowest-order bit (A in the drawing) of the multi-level code sequence 12 as it is as the bit inverted signal 23. The signal conversion section 116 is constituted of an exclusive-OR circuit 141, and performs the exclusive-OR operation between the information data 10 and the inverted signal 23, and outputs a result of the operation as the binary converted signal 24. The multi-level code conversion section 213a at a receiving end may be also realized by the same configuration as the multi-level code conversion section 115a at a transmitting end.

The configuration of the multi-level code conversion section 115a and the signal conversion section 116 shown in FIG. 19 is merely an example. In addition to this, a setting of bits not to be used may be made arbitrarily, as long as the setting at the transmitting end and that at the receiving end are unified. Further, the inverted signal 23 has a configuration in which the lowest-order bit of the multi-level code sequence 12 is outputted as it is. In addition to this, any given bit of multi-level code sequence 12 may be used. Alternatively, the value of the inverted signal 23 may be determined in accordance with a logical operation on all bits or some bits of the multi-level code sequence 12. Further, it is possible to additionally prepare a cipher key which is secretly shared between the transmitting end and the receiving end, and the above-described setting of the bits not to be used may be made in accordance with the cipher key.

Component parts shown in FIG. 19 may be replaced with different elements each having a similar function. Further, each of the component parts is not limited to hardware, and the function thereof may be realized by software processing.

As above described, according to the fourth embodiment of the present invention, even in the case where a binary modulated signal is used, it is possible to increase the computational complexity required for the decryption by the eavesdropper. Therefore, it is possible to improve the safety against eavesdropping without complicating a hardware configuration.

Fifth Embodiment

The present embodiment is an exemplary case where, in the second embodiment, a cipher key which is secretly shared between the transmitting end and the receiving end, is additionally prepared so as to set levels of the multi-level signal to be overlapped in accordance with the cipher key.

Figure 20:
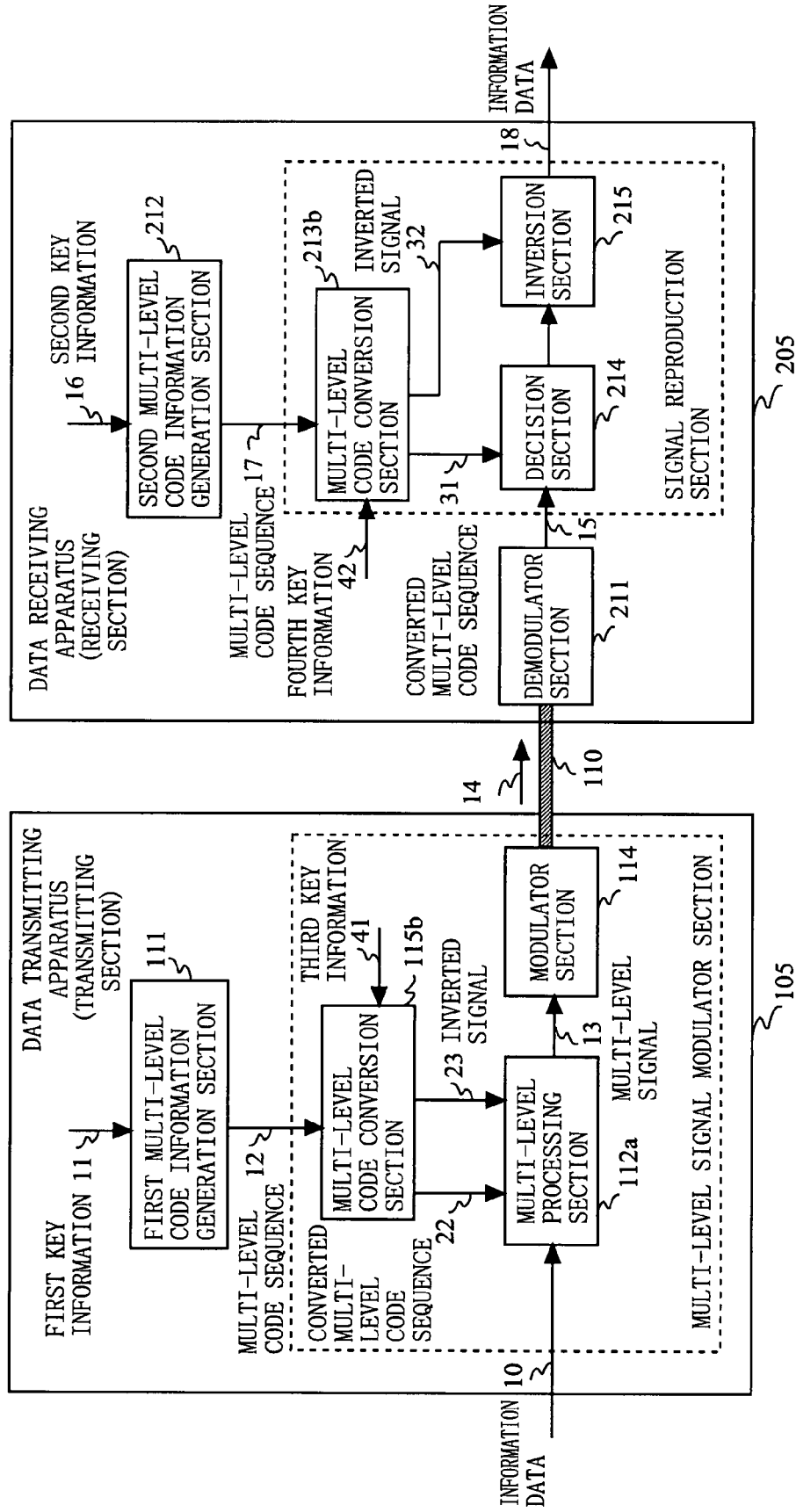
FIG. 20 is a block diagram showing an exemplary configuration of a data communication apparatus 5 according to a fifth embodiment of the present invention.

FIG. 20 is a block diagram showing an exemplary configuration of a data communication apparatus 5 according to a fifth embodiment of the present invention. As shown in FIG. 20, the data communication apparatus 5 has a configuration in which a data transmitting apparatus (hereinafter referred to as a transmitting section) 105 and a data receiving apparatus (hereinafter referred to as a receiving section) 205 are connected to each other via a transmission line 110. The transmitting section 105 includes a first multi-level code generation section 111, a multi-level processing section 112a, a modulator section 114, and a multi-level code conversion section 115b. The receiving section 205 includes a demodulator section 211, a second multi-level code generation section 212, a multi-level code conversion section 213b, a decision section 214, and an inversion section 215. In FIG. 20, although an eavesdropper receiving section 301 is not described, it will be supposed that an eavesdropper will attempts eavesdropping by using a method described in the first embodiment.

In the present embodiment, function blocks other than the multi-level code conversion section 115b and the multi-level code conversion section 213b are the same as the function blocks described in the second embodiment, and thus description thereof will be omitted. Hereinafter, parts different from the second embodiment will be described.

In the present embodiment, in addition to the first key information 11 and the second key information 16, the transmitting section 105 and the receiving section 205 previously retains third key information 41 and fourth key information 42, respectively. Based on the third key information 41, the multi-level code conversion section 115*b* randomly selects a bit to be outputted as the multi-level code sequence 22, and a bit to be outputted as the inverted signal 23 from among bits constituting the multi-level code sequence 12. In the same manner as the multi-level code conversion section 115*b*, based on the fourth key information 42, the multi-level code conversion section 213*b* randomly selects a bit to be outputted as a multi-level code sequence 31, and a bit to be outputted as the inverted signal 32 from among bits constituting the multi-level code sequence 17.

Next, with reference to an example shown in FIG. 21, a relation among the multi-level code sequence 12, the converted multi-level code sequence 22, and the inverted signal 23 in the present embodiment will be described. FIG. 21 is a diagram showing corresponding patterns among the multi-level code sequence 12, the converted multi-level code sequence 22, and the inverted signal 23 according to the fifth embodiment of the present invention. In FIG. 21, values of the multi-level code sequence 12 are each represented by a binary number (numbers in parentheses are each described in a decimal number). In the present embodiment, a plurality of the corresponding patterns (four types in an example shown in FIG. 21) is prepared. In each of the corresponding patterns, the values of the multi-level code sequence 12 are divided into several groups, and values of the converted multi-level code sequence 22 are allocated to each of the several groups. In each of the several groups, values of the inverted signal 23 are allocated so as to be distributed evenly. This is realized based on a procedure described as follows.

First, the multi-level code conversion section 115*b* at the transmitting end generates a pseudo random number by using the third key information 41, and then selects one pattern from among the plurality of the corresponding patterns in accordance with a value of the pseudo random number. In accordance with the selected corresponding pattern and the value of the multi-level code sequence 12, the multi-level code conversion section 115*b* determines the value of the converted multi-level code sequence 22 and the value of the inverted signal 23. That is, the multi-level code conversion section 115*b* selects one bit (represented in bold in FIG. 21) from among the bits constituting the multi-level code sequence 12, and determines, based on a value of the one bit, the value of the converted multi-level code sequence 22. The multi-level code conversion section 115*b* further selects one bit (represented in italics in FIG. 21) from among the remaining bits of the multi-level code sequence 12, and determines, based on a value of the selected one bit, the value of the inverted signal 23. Corresponding patterns may be considered in addition to those shown in FIG. 21, however, description thereof will be omitted, here. Next, using a method similar to that described with reference to FIG. 9, the multi-level processing section 112*a* determines a signal level of the multi-level signal 13 in accordance with the value of the converted multi-level code sequence 22, the value of the inverted signal 23, and the value of the information data 10.

On the other hand, in the same manner as the multi-level code conversion section 115*b* at the transmitting end, the multi-level code conversion section 213*b* at the receiving end generates a pseudo random number by using the fourth key information 42, and selects one of the plurality of the corresponding patterns in accordance with a value of the pseudo random number. In accordance with the selected corresponding pattern and a value of the multi-level code sequence 17, the multi-level code conversion section 213*b* determines a value of the converted multi-level code sequence 31 and a value of the inverted signal 32.

The levels of multi-level signal level are determined in this manner, and consequently values "0" and "1" may be allocated to each of the bits constituting the multi-level code sequence 12, which corresponds to each of the values of the converted multi-level code sequence 22 and to each of the levels of the multi-level signal. For example, in an example shown in FIG. 21, the value "0" of the converted multi-level code sequence 22 (corresponding to levels L1 and L3 of the multi-level signal) corresponds to values "0" to "14" of the multi-level code sequence 12 (represented in decimal form), and the value "1" of the converted multi-level code sequence 22 (corresponding to levels L2 and L4 of the multi-level signal) corresponds to values "1" to "15" of the multi-level code sequence 12. When these correspondence is considered in binary form, the values "0" and "1" of the converted multi-level code sequence 22 are allocated to both of the values "1" and "0" constituting each of the bits of the multi-level code sequence 12. From the eaves dropper's point of view, if conversion to binary is performed at the time of decrypting key information by using the decryption processing section 313, "0" and "1" cannot be identified with respect to all the bits. That is, an erroneous identification may be caused. Therefore, the decryption needs to be performed in consideration of such possibility of erroneous identification, and thus the computational complexity is increased further than the first and the second embodiments, whereby the safety improves.

In FIG. 21, although the multi-level number of the multi-level code sequence 12 is 16 (a bit count is 4), and the overlapping number thereof is 8, these are merely examples, and different values may be used. Further, the relation among the multi-level code sequence 12, the converted multi-level code sequence 22, and the inverted signal 23 is merely an example, and a different relation may be applicable. Note that even in such a case, the value of the inverted signal 23 needs to be evenly distributed to a group of the multi-level code sequence 12 which is allocated to one value of the converted multi-level code sequence 22.

Figure 22:
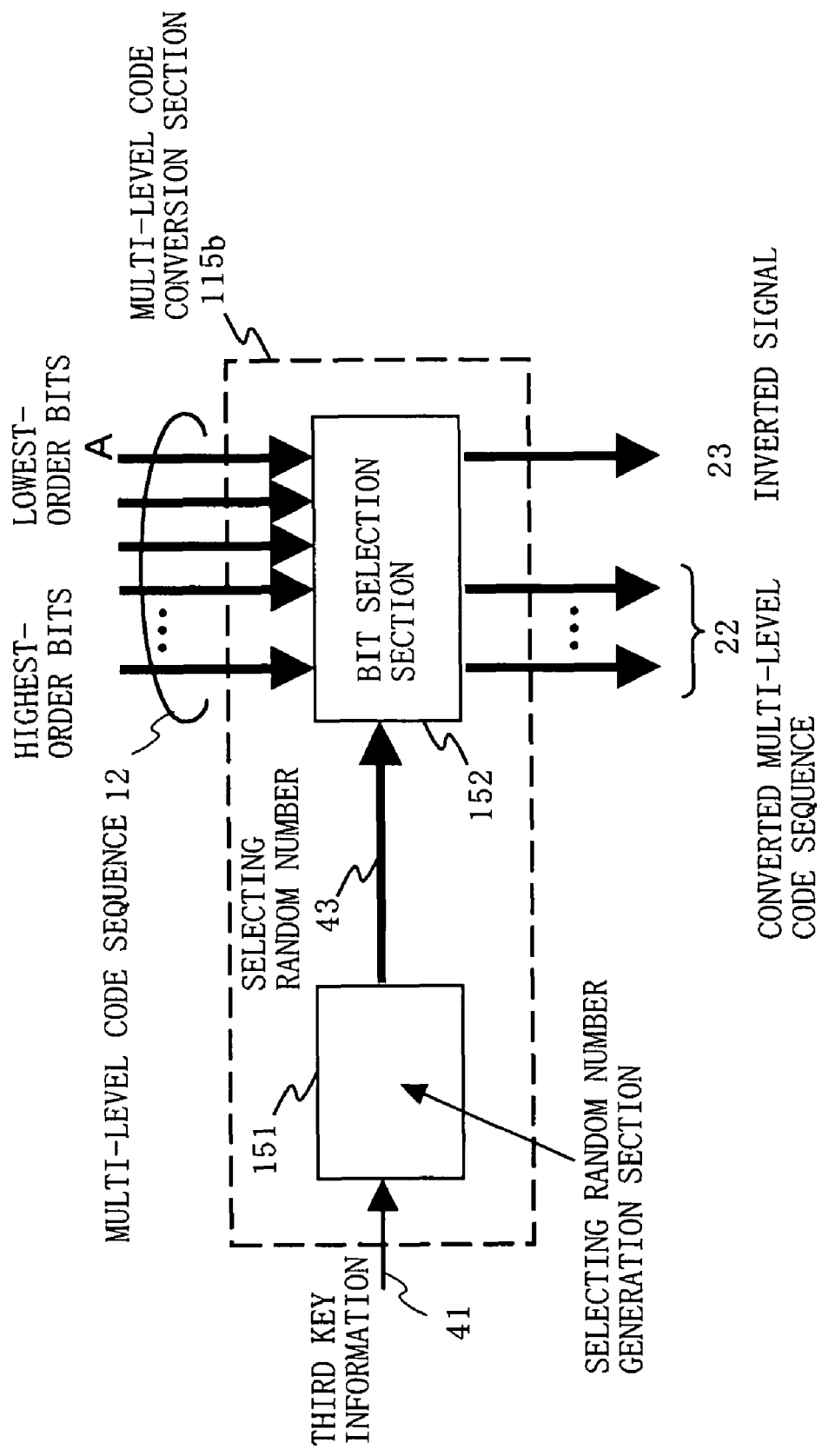
FIG. 22 is a block diagram showing an exemplary configuration of a multi-level code conversion section 115b according to the fifth embodiment of the present invention.

Next, a specific exemplary configuration of the multi-level code conversion section 115*b* at the transmitting end will be described. FIG. 22 is a block diagram showing an exemplary configuration of the multi-level code conversion section 115*b*. According to a configuration shown in FIG. 22, the multi-level code sequence 12 and the converted multi-level code sequence 22 are each in a parallel signal form. Based on the third key information 41, a selecting random number generation section 151 generates a selecting random number 43, which has the same symbol rate as the multi-level code sequence 12 (and multi-level signal 13), and which is a multi-level signal or a binary signal, whose value changes so as to be an approximately random number. The multi-level number of the selecting random number 43 is set so as to be equal to the number of corresponding patterns among the multi-level code sequence 12, the inverted signal 23, and the converted multi-level code sequence 22. To a bit selection section 152, the multi-level code sequence 12 and the selecting random number 43 are inputted. The bit selection section 152 selects and outputs a bit to be used as the converted multi-level code sequence 22 and a bit to be used as the inverted signal 23, respectively, from among the bits constituting the multi-level code sequence 12 in accordance with a value of the selecting random number 43.

Figure 23:
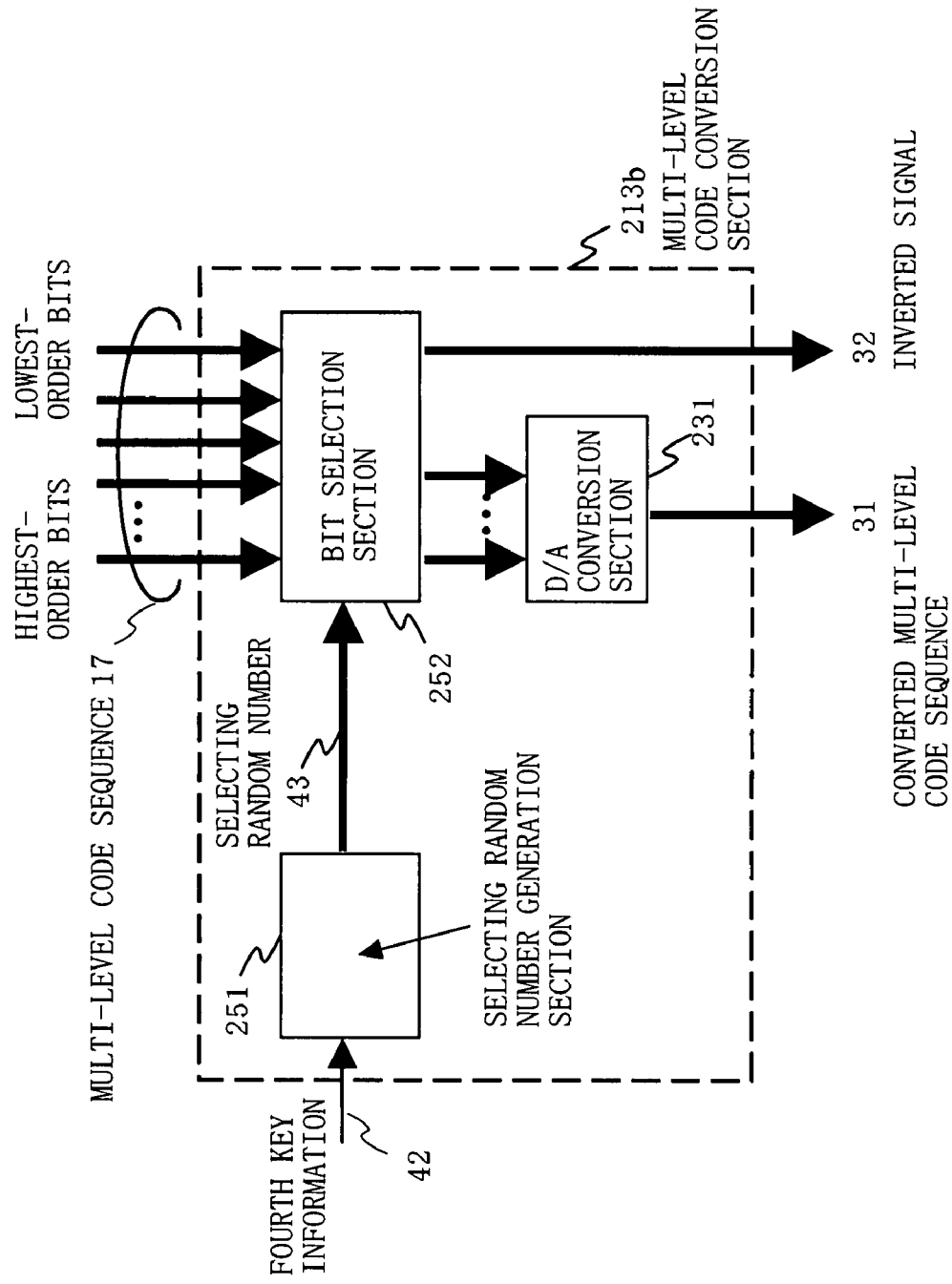
FIG. 23 is a block diagram showing an exemplary configuration of a multi-level code conversion section 213b according to the fifth embodiment of the present invention.

Next, a specific exemplary configuration of the multi-level code conversion section 213*b* at the receiving end will be described. FIG. 23 is a block diagram showing an exemplary configuration of the multi-level code conversion section 213b. As shown in FIG. 23, the selecting random number generation section 251 generates a selecting random number 44 having the same value as the selecting random number 43 in accordance with the third key information 41. In the same manner as the bit selection section 152, the bit selection section 252 selects and outputs a bit to be used as the converted multi-level code sequence 31 and a bit to be used as the inverted signal 32, respectively, from among the bits constituting the multi-level code sequence 17 in accordance with a value of the selecting random number 44.

The configuration of the multi-level code conversion section 115b and 213b shown in each of FIGS. 22 and 23 is merely an example, and a different configuration may be used as long as a similar function can be realized. Further, component parts except for the D/A conversion section 231 are not limited to hardware, and functions thereof may be realized by software processing.

A concept of the present embodiment may be applicable to the configuration according to the first embodiment described with reference to FIG. 1. FIG. 24 is a block diagram showing an exemplary configuration of the level conversion section 113b in the case where the level conversion section 113b is applied to the configuration according to the first embodiment. As shown in FIG. 24, the level conversion section 113b has a D/A conversion section 131b, a selecting random number generation section 151b, and a bit selection section 152b. Based on the third key information 41, the selecting random number generation section 151b generates a selecting random number 43, which has the same symbol rate as the multi-level code sequence 12 (and the multi-level signal 13), and which is a multi-level signal, whose value changes so as to be an approximately random number, or a binary signal. To the bit selection section 152, the multi-level signal 13 and the selecting random number 43 are inputted. The bit selection section 152b selects and outputs bits to be used from among bits constituting the multi-level signal 13 in accordance with a value of the selecting random number 43. Note that, in this example, since the information data 10 is included as the highest-order bit of the multi-level signal 13, the D/A conversion section 131b will definitely select the highest-order of the multi-level signal 13. The D/A conversion section 131b performs digital/analog conversion of the bits selected by the bit selection section 152b, and generates the converted multi-level code sequence 21.

As above described, according to the fifth embodiment of the present invention, the computational complexity required for the decryption processing performed by the eavesdropper is further increased than the first and second embodiments, whereby the safety against the eavesdropping can be improved.

The data communication apparatus according to the present invention is useful as a secret communication apparatus or the like which is safe and insusceptible to eavesdropping and interception.

While the invention has been described in detail, the foregoing description is in all aspects illustrative and not restrictive. It is understood that numerous other modifications and variations can be devised without departing from the scope of the invention.

What is claimed is:

1. A data transmitting apparatus for encrypting information data by using predetermined key information and performing secret communication with a receiving apparatus, the data transmitting apparatus comprising:
a multi-level code generation section for generating, based on the predetermined key information, a multi-level code sequence in which a signal level changes so as to be approximately random numbers; and
a multi-level signal modulator section for generating a signal having a plurality of signal levels in accordance with the information data and the multi-level code sequence, modulating the generated signal in a predetermined modulation method, and outputting a modulated signal, wherein
the multi-level signal modulator section divides the signal having a plurality of levels each corresponding to a combination of the information data and the multi-level code sequence into a plurality of groups, and causes a plurality of levels included in each of the plurality of groups to be allocated to one level in an overlapped manner so as to generate the signal having the plurality of signal levels.

2. The data transmitting apparatus according to claim 1, wherein
the multi-level signal modulator section includes:
a multi-level processing section for combining the information data and the multi-level code sequence, and generating a multi-level signal having the plurality of levels each corresponding to the combination of the information data and the multi-level code sequence;
a level conversion section for dividing the multi-level signal into the plurality of groups, and causing the plurality of levels included in said each of the plurality of groups to be allocated to the one level in the overlapped manner so as to convert the multi-level signal into a converted multi-level signal; and
a modulator section for modulating the converted multi-level signal in the predetermined modulation method, and outputting a modulated signal.

3. The data transmitting apparatus according to claim 2, wherein the converted multi-level signal has a same symbol rate as the multi-level signal, and is a signal having a multi-level number smaller than a multi-level number of the multi-level signal.

4. The data transmitting apparatus according to claim 2, wherein
the multi-level signal is represented by a plurality of bits, and
the level conversion section includes a D/A conversion section for selecting some of the plurality of bits of the multi-level signal, performing digital/analog conversion of the selected some of the plurality of bits, and generating the converted multi-level signal.

5. The data transmitting apparatus according to claim 4, wherein
the level conversion section further includes:
a selecting random number generation section for generating a pseudo random number by using predetermined selecting key information; and
a bit selection section for selecting the some of the plurality of bits of the multi-level signal in accordance with the pseudo random number,
the D/A conversion section performs the digital/analog conversion of the some of the plurality of bits selected by the bit selection section, and generates the converted multi-level signal.

6. The data transmitting apparatus according to claim 2, wherein
the multi-level signal is represented by a plurality of bits,
the level conversion section includes:
a bit conversion circuit in which the some of the plurality of bits of the multi-level signal are inputted, for performing a logical operation on the inputted some of the plurality of bits, and outputting a bit converted signal having a bit count smaller than a bit count of the inputted some of the plurality of bits; and a D/A conversion section for performing the digital/analog conversion of remaining bits of the plurality of bits of the multi-level signal, which are not to be inputted to the bit conversion circuit, and of the bit converted signal, and generating the converted multi-level signal.

7. The data transmitting apparatus according to claim 4, wherein
the level conversion section further includes:
a random number generation section for generating a conversion random number which is a binary random number; and
an exclusive-OR circuit for performing an exclusive-OR operation between any one of the plurality of bits of the multi-level signal and the conversion random number, and outputting a result of the exclusive-OR operation to the D/A conversion section.

8. The data transmitting apparatus according to claim 6, wherein
the level conversion section further includes:
a random number generation section for generating a conversion random number which is a binary random number; and
an exclusive-OR circuit for performing an exclusive-OR operation between any one of the plurality of bits of the multi-level signal and the conversion random number, and outputting a result of the exclusive-OR operation to the D/A conversion section.

9. The data transmitting apparatus according to claim 1, wherein
the multi-level signal modulator section includes:
a multi-level code conversion section for converting the multi-level code sequence into a converted multi-level code sequence and an inverted signal;
a multi-level processing section for combining the information data, the converted multi-level code sequence and the inverted signal, and generating a multi-level signal having a plurality of levels each corresponding to a combination among the information data, the converted multi-level code sequence, and the inverted signal; and
a modulator section for modulating the multi-level signal in the predetermined modulation method and outputting a modulated signal,
the converted multi-level code sequence has a same symbol rate as the multi-level code sequence, and is a signal having a multi-level number smaller than a multi-level number of the multi-level code sequence,
the inverted signal is a binary signal having a bit rate which is equal to the symbol rate of the multi-level code sequence.

10. The data transmitting apparatus according to claim 9, wherein the multi-level processing section performs an exclusive-OR operation between the information data and the inverted signal, combines a result of the exclusive-OR operation and the converted multi-level code sequence, and generates the multi-level signal.

11. The data transmitting apparatus according to claim 9, wherein the multi-level code conversion section causes a plurality of levels included in the multi-level code sequence to be allocated to one level, in an overlapped manner, so as to convert the multi-level code sequence into the converted multi-level code sequence.

12. The data transmitting apparatus according to claim 11, wherein
the multi-level code sequence is represented by a plurality of bits,
the multi-level code conversion section outputs some of the plurality of bits of the multi-level code sequence as the converted multi-level code sequence, and also outputs any one of the plurality of bits of the multi-level code sequence as the inverted signal.

13. The data transmitting apparatus according to claim 12, wherein
the multi-level code conversion section includes:
a selecting random number generation section for generating a pseudo random number by using predetermined selecting key information; and
a bit selection section for selecting some of the plurality of bits of the multi-level code sequence in accordance with the pseudo random number so as be outputted as the converted multi-level code sequence, and also outputting any one bit of the multi-level code sequence as the inverted signal.

14. The data transmitting apparatus according to claim 11, wherein
the multi-level code sequence is represented by a plurality of bits,
the multi-level code conversion section
includes a bit conversion circuit in which some of the plurality of bits of the multi-level code sequence are inputted, for performing a logical operation on the inputted some of the plurality of bits so as to be converted into a signal having a bit count smaller than a bit count of the inputted some of the plurality of bits, and outputting the converted signal as a bit converted signal, and
outputs remaining bits of the plurality of bits of the multi-level code sequence and the bit converted signal as the converted multi-level code sequence, and also outputs any one of the plurality of bits of the multi-level code sequence as the inverted signal.

15. The data transmitting apparatus according to claim 12, wherein
the multi-level code conversion section further includes:
a random number generation section for generating a conversion random number which is a binary random number; and
a bit operation circuit in which any one of the plurality of bits of the multi-level code sequence is inputted, for performing an exclusive-OR operation between the inputted one of the plurality of bits and the conversion random number, and outputting a result of the exclusive-OR operation as the inputted one of the plurality of bits.

16. The data transmitting apparatus according to claim 14, wherein
the multi-level code conversion section further includes:
a random number generation section for generating a conversion random number which is a binary random number; and
a bit operation circuit in which any one of the plurality of bits of the multi-level code sequence is inputted, for performing an exclusive-OR operation between the inputted one of the plurality of bits and the conversion random number, and outputting a result of the exclusive-OR operation as the inputted one of the plurality of bits.

17. The data transmitting apparatus according to claim 1, wherein
the multi-level signal modulator section includes:
a multi-level code conversion section for converting the multi-level code sequence into an inverted signal;
a signal conversion section for performing an exclusive-OR operation between the information data and the inverted signal, and outputting a result of the exclusive-OR operation as a binary converted signal; and
a modulator section for modulating the binary converted signal in the predetermined modulation method, and outputting the modulated signal,
the inverted signal and the binary converted signal are each a binary signal having a bit rate which is equal to a symbol rate of the multi-level code sequence.

18. The data transmitting apparatus according to claim 17, wherein
the multi-level code sequence is represented by a plurality of bits, and
the multi-level code conversion section outputs any one of the plurality of bits of the multi-level code sequence as the inverted signal.

* * * * *